US007059566B2

(12) United States Patent
Byers et al.

(10) Patent No.: US 7,059,566 B2
(45) Date of Patent: Jun. 13, 2006

(54) UNMANNED AERIAL VEHICLE FOR LOGISTICAL DELIVERY

(75) Inventors: David W. Byers, Arlington, VA (US); Gary A. Hall, King George, VA (US); Graham D. Hunter, Horncastle (GB); Colen G. Kennell, University Park, MD (US); Aleksander B. Macander, Rockville, MD (US); Judah H. Milgram, Hyattsville, MD (US); Jason D. Strickland, Gaithersburg, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/856,360

(22) Filed: May 27, 2004

(65) Prior Publication Data

US 2005/0006525 A1 Jan. 13, 2005

Related U.S. Application Data

(60) Provisional application No. 60/479,847, filed on Jun. 20, 2003.

(51) Int. Cl.
*B64C 1/00* (2006.01)
(52) U.S. Cl. ..................................... 244/119
(58) Field of Classification Search ............. 244/137.1, 244/136, 137.2, 137.3, 138–141, 117 R, 118.1, 244/118.2, 119, 125, 118.5
See application file for complete search history.

(56) References Cited

U.S. PATENT DOCUMENTS 2,310,765 A * 2/1943 Dornier ............... 244/117 R
2,446,441 A * 8/1948 Taylor ...................... 244/118.1
2,511,876 A * 6/1950 Protzeller ..................... 62/186
2,949,841 A * 8/1960 Richardson .................. 454/76
3,209,929 A * 10/1965 Petersen et al. ............ 414/676
4,161,301 A * 7/1979 Beardsley et al. ........ 244/137.3

(Continued)

OTHER PUBLICATIONS

Jeff Fisher and Sean Wellman, "Semi-Rigid Deployable Wing (SDW) Advanced Precision Airborne Delivery System," AIAA-97-1495, 14th AIAA Aerodynamic Decelerator System Technology Conference, San Francisco, California, Jun. 3-5, 1997, pp. 244-253, American Institute of Aeronautics and Astronautics, Inc., 1997.

(Continued)

*Primary Examiner*—Teri Pham Luu
*Assistant Examiner*—Stephen A. Holzen
(74) *Attorney, Agent, or Firm*—Howard Kaiser

(57) ABSTRACT

A hollow elliptical-cylindrical hull conformingly houses a hollow rectangular-prismatic cabin whereby the four longitudinal parallel outside edges of the latter make contact with the inside surface of the former. The fully constructed aircraft (either non-powered or powered) includes the integral hull-plus-cabin structure along with nose, tail and airfoil structures that are coupled therewith. The cabin conformingly accommodates hollow rectangular-prismatic modules useful for cargo storage. While the nose and/or tail structure is uncoupled from the integral hull-plus-cabin structure, the modules are inserted into the cabin and the cabin is sealed. The aircraft is lifted (e.g., via airplane, helicopter, rocket or balloon) to a particular elevation and released, whereupon the two wings fully emerge and the aircraft effects controlled flight until reaching its destination. After landing, the nose and/or tail structure is uncoupled from the integral hull-plus-cabin structure, the cabin is unsealed, and the modules are removed from the cabin.

22 Claims, 28 Drawing Sheets

U.S. PATENT DOCUMENTS

| | | |
|---|---|---|
| 4,256,012 A * | 3/1981 | Cowart et al. ............. 89/1.816 |
| 4,699,336 A * | 10/1987 | Diamond .................... 244/140 |
| 4,717,093 A | 1/1988 | Rosenberger et al. |
| 5,240,207 A | 8/1993 | Eiband et al. |
| 5,244,169 A | 9/1993 | Brown et al. |
| 5,372,336 A | 12/1994 | Paez |
| 5,716,032 A | 2/1998 | McIngvale |
| 5,890,441 A | 4/1999 | Swinson et al. |
| 6,056,237 A | 5/2000 | Woodland |
| 6,082,667 A | 7/2000 | Haggard |
| 6,116,606 A | 9/2000 | Brum et al. |
| 6,176,451 B1 | 1/2001 | Drymon |
| 6,260,797 B1 | 7/2001 | Palmer |
| 6,286,410 B1 | 9/2001 | Leibolt |
| 6,377,875 B1 | 4/2002 | Schwaerzler |
| 6,392,213 B1 | 5/2002 | Martorana et al. |
| 6,409,122 B1 | 6/2002 | Nicolai |
| 6,471,160 B1 | 10/2002 | Grieser |
| 6,587,762 B1 | 7/2003 | Rooney |
| 6,607,162 B1 | 8/2003 | Warsop et al. |
| 6,626,398 B1 | 9/2003 | Cox et al. |
| 6,640,739 B1 | 11/2003 | Woodall et al. |
| 6,665,594 B1 | 12/2003 | Armstrong |
| 6,666,409 B1 | 12/2003 | Carpenter et al. |
| 6,694,228 B1 | 2/2004 | Rios |
| 6,742,741 B1 | 6/2004 | Rivoli |
| 6,751,530 B1 | 6/2004 | Seifert et al. |
| 6,792,363 B1 | 9/2004 | Bye |
| 6,817,573 B1 | 11/2004 | Harrison et al. |
| 6,853,875 B1 | 2/2005 | Moritz et al. |
| 6,856,894 B1 | 2/2005 | Bodin et al. |
| 6,868,314 B1 | 3/2005 | Frink |
| 6,869,042 B1 | 3/2005 | Harrison |
| 6,874,729 B1 | 4/2005 | McDonnell |
| 2003/0001045 A1 | 1/2003 | Yifrach |
| 2005/0006525 A1 | 1/2005 | Byers et al. |
| 2005/0017129 A1 | 1/2005 | McDonnell |
| 2005/0109259 A1 | 5/2005 | August |
| 2005/0134496 A1 | 6/2005 | Trainor |
| 2002/0104923 A1 | 8/2005 | Warsop et al. |

OTHER PUBLICATIONS

Judah Milgram, Jason Strickland, Alexander Macander and Graham Hunter, "Autonomous Glider Systems for Logistics Delivery," presented at the AUVSI (Associated for Unmanned Vehicle Systems International) 2003 Unmanned Systems Symposium and Exposition, Baltimore Convention Center, Baltimore, Maryland, Jul. 15-17, 2003, 15 pages.

Web page entitled "Inflatable Wings," http://www.vertigo-inc.com/Aeronautical_Systems/GLOV/GLOV.html, 2 pages, printed out (in color) on Sep. 13, 2004, web page in Vertigo Inc. website (Aeronautical Engineering and Development Company; mailing address P.O. Box 117, Lake Elsinore, California 92531-0117; shipping address 29885 2nd street, Suite N, Lake Elsinore, California 92532; phone 909-674-0604; fax 909-674-5461; website http://www.vertigo-inc.com/home.html).

"Dragon System™," Pratt & Whitney, A United Technologies Company, USBI Co. This brochure-like printed document (a single, medially folded sheet having 3 printed sides and a blank side, the $2^{nd}$ and $3^{rd}$ sides being juxtaposed) was observed circa 1998 or 1999; however, the printing date and year are unknown. The attached color printout copy is 3 pages, corresponding to the 3 printed sides.

Web page entitled "United Space Boosters Inc. (USBI Corp.)," http://www.uavforum.com/vendors/systems/usbi.htm, 1 page, printed out (in color) on Sep. 13, 2004, web page in UAV Forum website (http://www.uavforum.com).

* cited by examiner

| | | |
|---|---|---|
| gross weight | $W$ | 1500 lb (667 daN) |
| wing span | $b$ | 12.9 m (42.3 ft) |
| wing area | $S$ | 16.8 m² (181 ft²) |
| wing loading | $W/S$ | 39.7 daN/m² (8.3 psf) |
| taper ratio | $\lambda$ | 0.5 |
| root chord | $c_r$ | 1.74 m (5.71 ft) |
| tip chord | $c_t$ | 0.87 m (2.85 ft) |
| aspect ratio | AR | 9.9 |
| airfoil | | notional 18% with $c_{d_0} = 0.0080$ and $c_{m_{ac}} = -0.100$ |
| stabilizer area | $S_t$ | 1.7 m² (18.3 ft²) (based on $l_t$=1.4 m, 4.6 ft) |
| estimated best L/D | | 20.3 (neglects trim drag!) |
| airspeed for best L/D | | 63 kt (32.5 m/s) EAS (equivalent airspeed) |
| rate of descent at best glide speed | | 314 fpm (1.6 m/s) |
| stall speed ($C_L$=1.5) | | 40 kt (20.8 m/s) EAS (equivalent airspeed) |
| minimum gas supply | | 150 liters (5.3 ft³) at 3000 psi (207 bar) |
| multitube structural effectiveness | $\kappa$ | 0.5, based on four tubes with largest extending through full depth of airfoil |

FIG. 5

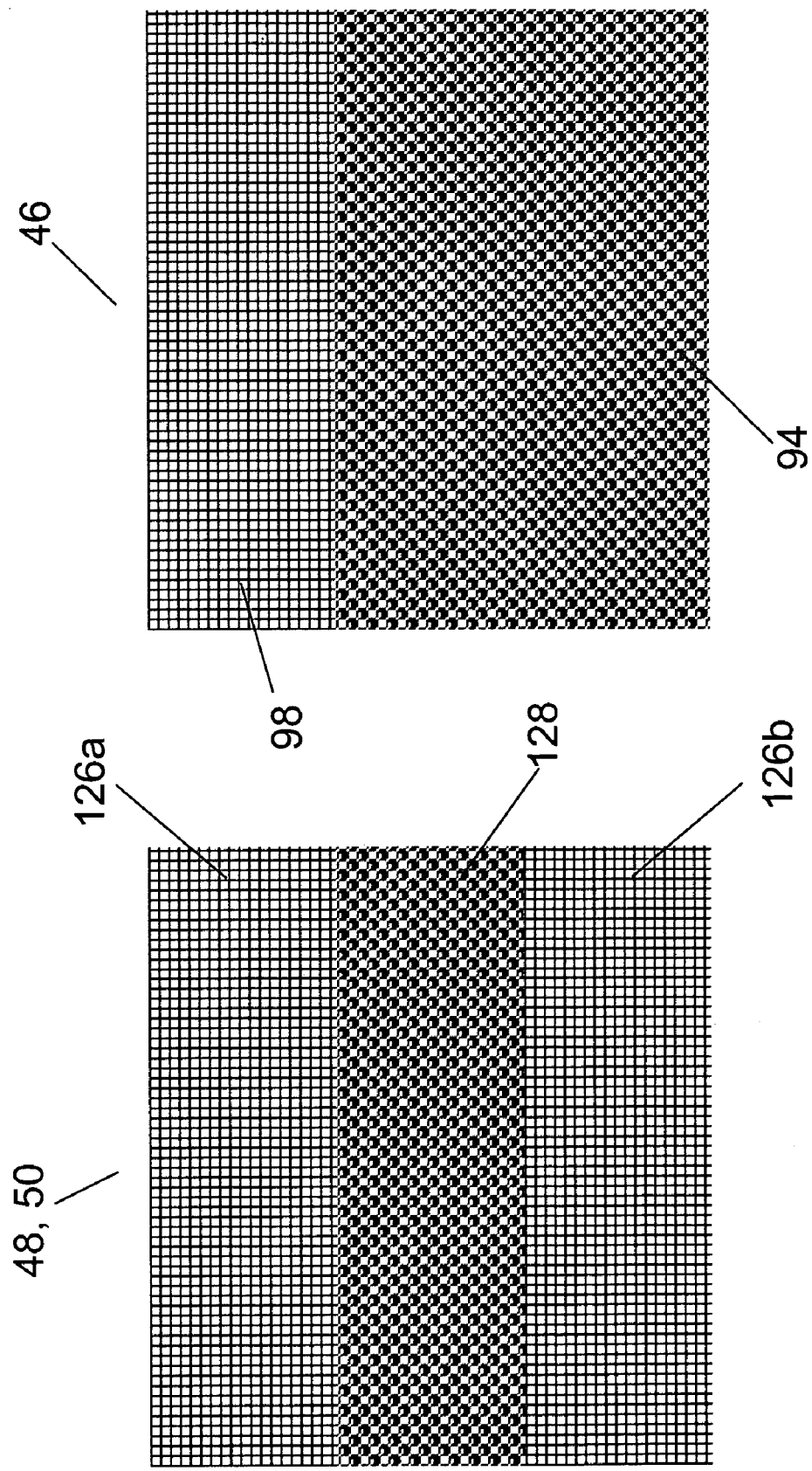

| Density | lb/cu.ft | 3 | 4 | 5 | 6 | 8 |
|---|---|---|---|---|---|---|
| Comp.Str. | lb/sq.in | 80 | 116 | 177 | 290 | 406 |
| Tens. Str. | lb/sq.in. | 175 | 217 | 304 | 450 | 580 |
| Shear Str. | lb/sq.in. | 65 | 102 | 152 | 217 | 312 |
| Comp.Mod. | lb/sq.in | 5,800 | 8,700 | 11,600 | 20,300 | 27,550 |
| Shear Mod. | lb/sq.in. | 2,170 | 3,190 | 4,350 | 6,520 | 7,970 |

FIG. 21

| Property | Unit | Glass/Vinyl Ester | Graphite/Epoxy |
|---|---|---|---|
| DENSITY | lb/cu.ft. | 0.068 | 0.057 |
| TENSILE STR. | lb/sq.in | 51,600 | 90,000 |
| FLEX.STR. | lb/sq.in. | 71,700 | 0 |
| COMP.STR. | lb/sq.in. | 47,800 | 52,000 |
| IN PLANE SHEAR | lb/sq.in. | 9,500 | 6,940 |
| TENSILE MOD. | lb/sq.in. | 3,500,000 | 8,730,000 |
| FLEX. MOD. | lb/sq.in. | 3,100,000 | 0 |
| COMP. MOD. | lb/sq.in. | 3,900,000 | 0 |
| SHEAR MOD. | lb/sq.in. | 620,000 | 1,070,000 |
| POISSONS RATIO | Vt & Vc | 0.14 | 0.19 |

FIG. 22

UNMANNED AERIAL VEHICLE FOR LOGISTICAL DELIVERY

CROSS-REFERENCE TO RELATED APPLICATIONS

This application claims the benefit of U.S. Provisional Application Ser. No. 60/479,847, filed 20 Jun. 2003, inventors David W. Byers, Gary A. Hall, Graham D. Hunter, Colen G. Kennell, Aleksander B. Macander, Judah H. Milgram and Jason D. Strickland, entitled "Unmanned Aerial Vehicle for Logistical Delivery," incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to unmanned vehicles and to methods and systems utilizing unmanned vehicles, more particularly to same involving air transportation.

The United States Navy desires that its forces have a logistics sustainment projection power of up to 200 nautical miles, which is the typical distance from a ship launch point to the preplanned delivery or receipt point on land. Logistics presently available to U.S. forces operating in the littoral and more inland regions of the world depend on supplies being shipped in a conventional manner using existing air-based, ship-based or land-based assets. These methods of delivery, generally encompassed by what is referred to as the "iron mountain" approach, are ponderous. The iron mountain approach to cargo transport is constantly at risk of attack, is inherently expensive and requires considerable distribution logistics.

Various U.S. Department of Defense troop components (e.g., the Marine Corps and the US Army Special Operations units) are actively pursuing advanced parachute and airdrop technologies such as high altitude, deployable, precision airdrop systems for payload weights in the range of 200 to 40,000 pounds. High altitude delivery significantly reduces but does not eliminate aircraft vulnerability. Moreover, considerable cost is associated with dedicated manned missions of this kind. Although aircraft risk and loss may be minimized or limited, cost remains a critical consideration.

An unmanned vehicle is an autonomous or semi-autonomous craft that performs one or more functions as if one or more persons were aboard. In recent years developmental interest in unmanned land, sea, air and space vehicles and vehicle systems has increased for a variety of military and civilian applications. Unmanned vehicle use has potential economic and risk benefits. Especially attractive is the ability of unmanned vehicles to perform dangerous or hazardous tasks without risk to humans. "Unmanned aerial vehicles" (abbreviated "UAVs") are also referred to as "unpiloted aircraft" or "flying drones."

The following U.S. patent documents, incorporated herein by reference, are informative about unmanned aerial vehicles or control systems pertaining thereto: Grieser U.S. Pat. No. 6,471,160 B2 issued Oct. 29, 2002; Nicolai U.S. Pat. No. 6,409,122 issued Jun. 25, 2002; Martorana et al. U.S. Pat. No. 6,392,213 issued May 21, 2002; Schwaerzler U.S. Pat. No. 6,377,875 B1 issued Apr. 23, 2002; Leibolt U.S. Pat. No. 6,286,410 B1 issued Sep. 11, 2001; Palmer U.S. Pat. No. 6,260,797 B1 issued Jul. 17, 2001; Drymon U.S. Pat. No. 6,176,451 B1 issued Jan. 23, 2001; Brum et al. U.S. Pat. No. 6,116,606 issued Sep. 12, 2000; Woodland U.S. Pat. No. 6,056,237 issued May 2, 2000; McIngvale U.S. Pat. No. 5,716,032 issued Feb. 10, 1998; Eiband et al. U.S. Pat. No. 5,240,207 issued Aug. 31, 1993; Yifrach U.S. patent application Publication 2003/0001045 A1 published Jan. 2, 2003. The following paper, incorporated herein by reference, is also pertinent: Jeff Fisher and Sean Wellman, "Semi-Rigid Deployable Wing (SDW) Advanced Precision Airborne Delivery System," AIAA-97-1495, $14^{th}$ AIAA Aerodynamic Decelerator Systems Technology Conference, San Fransico, Calif. Jun. 3–5, 1997 pages 224–253, American Institute of Aeronautics and Aeronautics, Inc. 1997.

SUMMARY OF THE INVENTION

In view of the foregoing, it is an object of the present invention to provide a methodology for effecting military logistical payload delivery in a safe, reliable, effective and economical manner.

The present invention provides method, apparatus and system suitable for meeting logistics delivery requirements of the U.S. Navy. The inventive methodology is based on the launching of a gliding vehicle (e.g., "glider") from a land-based, sea-based or air-based platform. As contemplated by the inventors, typically the launch platform will be located far offshore, wherein the unmanned payload vehicles will be launched from any of a variety of non-dedicated air and naval platforms operating at risk-free standoff distances from hostile shores. The present invention represents a supply-and-distribution approach for payload delivery to small operational troop units on an as-needed basis, using inexpensive, autonomous, un-powered, quiet, unmanned payload vehicles.

Typical embodiments of the inventive apparatus are suitable for inclusion by an air transport vehicle. The inventive apparatus comprises a hollow cylinder, a plurality of minor boxes for containing cargo, and a major box for containing the minor boxes. The hollow cylinder and the major box are joined so that the major box has four parallel edges touching the hollow cylinder. The minor boxes each fit within the major box and are capable of introduction and withdrawal with respect to the major box.

A typical cargo conveyance system in accordance with the present invention comprises an unmanned aerial vehicle and launching means. The unmanned aerial vehicle includes a hollow cylinder, a major box and a plurality of minor boxes. The major box is for containing the minor boxes. The minor boxes are for containing cargo. The hollow cylinder and the major box are joined so that the major box has four parallel edges touching the hollow cylinder. Each minor box fits within the major box and is capable of introduction and withdrawal with respect to the major box. The launching means is for moving (e.g., elevating or boosting) the unmanned aerial vehicle to a selected altitude, and typically to a selected position (e.g., geographic location) as well. The unmanned aerial vehicle and the launching means are separable when the unmanned aerial vehicle reaches the selected altitude. According to usual inventive practice, the launching means includes an airplane, a helicopter, a rocket or a balloon.

A typical inventive method for conveying cargo comprises: providing a fuselage section including a hollow cylinder and a major box, the hollow cylinder and the major box being joined so that the major box has four parallel edges touching the hollow cylinder; depositing cargo inside at least one minor box that fits inside said major box; placing at least one minor box inside the major box; uniting the fuselage section, a nose section, a tail section and plural airfoils, thereby forming at least a portion of an aerial vehicle; and, causing the aerial vehicle to be airborne while carrying the cargo. Many preferred inventive embodiments provide for an aerial vehicle that is an unmanned aerial vehicle. The moving of the unmanned aerial vehicle to a selected altitude and/or position (e.g., longitudinal and/or latitudinal position) includes the causing of the unmanned aerial vehicle to be airborne and the separating of the unmanned aerial vehicle and the moving means when the unmanned aerial vehicle reaches the selected altitude and/or position.

The present invention's system, which the inventors style the "Advanced Logistics Delivery System" (acronymously designated "ALDS"), supports the need to deliver supplies to dispersed U.S. special operational units located in rear offshore locations, and supports the need to do so reliably, on demand, twenty-fours hours a day and independently of environmental conditions. Of primary import to inventive practice, the inventive ALDS uses a low cost, disposable, unmanned, autonomous and un-powered aerial vehicle that can be operated off of a variety of launch platforms. It is anticipated that, as typically embodied if adopted by the U.S. Navy, the inventive ALDS will be capable of meeting long distance delivery goals (e.g., delivering up to 1,000 pounds or more of payload over a distance of up to 200 nautical miles) at low cost.

For most applications, the inventive UAV is preferably a glider. A glider is an un-powered vehicle (for which no fuel is required), the flight of which is based essentially on gravity and aerodynamics. A powered vehicle advantageously affords greater range as compared with a glider. However, unlike a glider, a powered vehicle is a potential source of an acoustic (e.g., noise) and/or infrared signature. Moreover, generally speaking, powered aircraft are more expensive than un-powered aircraft to develop and manufacture. Nevertheless, both powered aircraft, and glider aircraft will have a visual signature. In addition, in contrast to un-powered flight, powered flight might involve sacrifice of some storage space, due to the necessary accommodation of aircraft engines and other machinery related to powering the vehicle.

For most applications, the present invention's unmanned payload-carrying vehicle includes a body and a pair of wings. The inventive glider's body includes a nose, a fuselage (to be utilized for carrying a payload) and an empennage (i.e., a tail). The wings include port and starboard aerodynamic surfaces and are characterized by port and starboard airfoils. The inventive glider represents a unique carrier that lends itself to inexpensive construction and is thus disposable on landing. The inventive glider preferably includes a low-cost, rigid, composite sandwich construction for the fuselage and empennage, and a low-cost energy-absorbent composite foam construction for the nose. The fuselage structure, the empennage structure and the nose structure are each characterized by adequate aerodynamic strength and rigidity. The inventive glider's wings, which are initially stowed inside or adjacent to the fuselage, deploy to full extension (e.g., full inflation or full unfolding) when, post launch, the glider reaches a predetermined elevation (e.g., apogee) and position (e.g., geographic location). The stiffened inflatable wings are deployed "on demand" while in flight at the selected elevation pursuant to preprogrammed criteria.

According to current logistics practices, the "iron mountain" approach is followed for purposes of re-supplying troops in the field. Basically, the iron mountain approach implies that there is one large central deposit of supplies, that these supplies are originally brought in by ship or heavy air transport, and that these supplies are then distributed to smaller Special Operations ("Spec Ops") troop units operating far afield. Dedicated transport by air (e.g., helicopter, etc.) or by land (e.g., truck, pack mule, etc.) is required to accomplish the distribution and breakdown of these smaller amounts of supplies, thereby putting personnel operating these transport vehicles in harm's way. In addition to carrying a considerable personal risk, the iron mountain distribution system is economically inefficient, since personnel and equipment are better used for fighting rather than for transporting goods.

In contrast, the present invention's ALDS implements unmanned aero-glide, un-powered, autonomous payload vehicles that can carry smaller amounts of supplies for delivery to Spec Ops troops in the field. The inventive supply approach is essentially characterized by low risk to personnel because they will tend to be out of harm's way. The inventive system can be practiced at a fraction of the cost that would obtain if the delivery vehicle were manned. The inventive ALDS is based on an un-powered, expendable delivery UAV (unmanned aerial vehicle) that is noiseless and hence more suitable for covert operations than is a powered vehicle.

The inventive system will not only be capable of achieving Spec Ops cargo delivery, but will also be capable of performing tactical surveillance and monitoring of any ground activity of interest in real time, via simple onboard video telemetry, as the unmanned vehicle glides in to target. The inventive system's vehicle configuration, its dimensional characteristics and/or its payload capacity (currently envisioned to be approximately 1,000 pounds) can be designed to suit requirements of multifarious civilian and/or military applications such as those involving humanitarian missions.

Various aspects of the present invention are disclosed by the following paper, incorporated herein by reference: Judah Milgram, Jason Strickland, Alexander Macander and Graham Hunter, "Autonomous Glider Systems for Logistics Delivery," presented at the AUVSI (Association for Unmanned Vehicle Systems International) 2003 Unmanned Systems Symposium and Exposition, Baltimore Convention Center, Baltimore, Md., Jul. 15–17, 2003. This paper, coauthored by four of the present inventors, is included pre-presentation as "Appendix A" (15 pages) in the aforementioned U.S. Provisional application. In addition, future publication is planned of a U.S. Navy technical report, to be published by the Naval Surface Warfare Center, Carderock Division, 9500 MacArthur Boulevard, West Bethesda, Md., 20817-5700.

Other objects, advantages and features of the present invention will become apparent from the following detailed description of the present invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein:

FIG. 5 is a table listing basic design characteristics of an inventive UAV such as that shown in FIG. 4.

FIG. 19 is a partial cross-sectional view, diagrammatically rectilinear for illustrative purposes, of the composite three-layer "sandwich" structure of a typical fuselage shell or tail casing in accordance with the present invention, wherein a foam layer is situated between two fiber-reinforced material layers.

FIG. 20 is a partial cross-sectional view, diagrammatically rectilinear for illustrative purposes, of the composite two-system solid structure of a typical nose in accordance with the present invention, wherein a fiber-reinforced material skin overlay is situated upon a solid foam core.

FIG. 21 is a table listing typical material properties of the fiber-reinforced plastic (FRP) skin portion of a sandwich composite such as depicted in FIG. 19, or of the fiber-reinforced plastic (FRP) skin overlay portion of a solid composite such as depicted in FIG. 20.

FIG. 22 is a table listing typical material properties of the polyvinyl chloride (PVC) foam intermediate layer portion of a sandwich composite such as depicted in FIG. 19, or of the polyvinyl chloride (PVC) foam core portion of a solid composite such as depicted in FIG. 20.

DETAILED DESCRIPTION OF THE INVENTION

Figure 1:
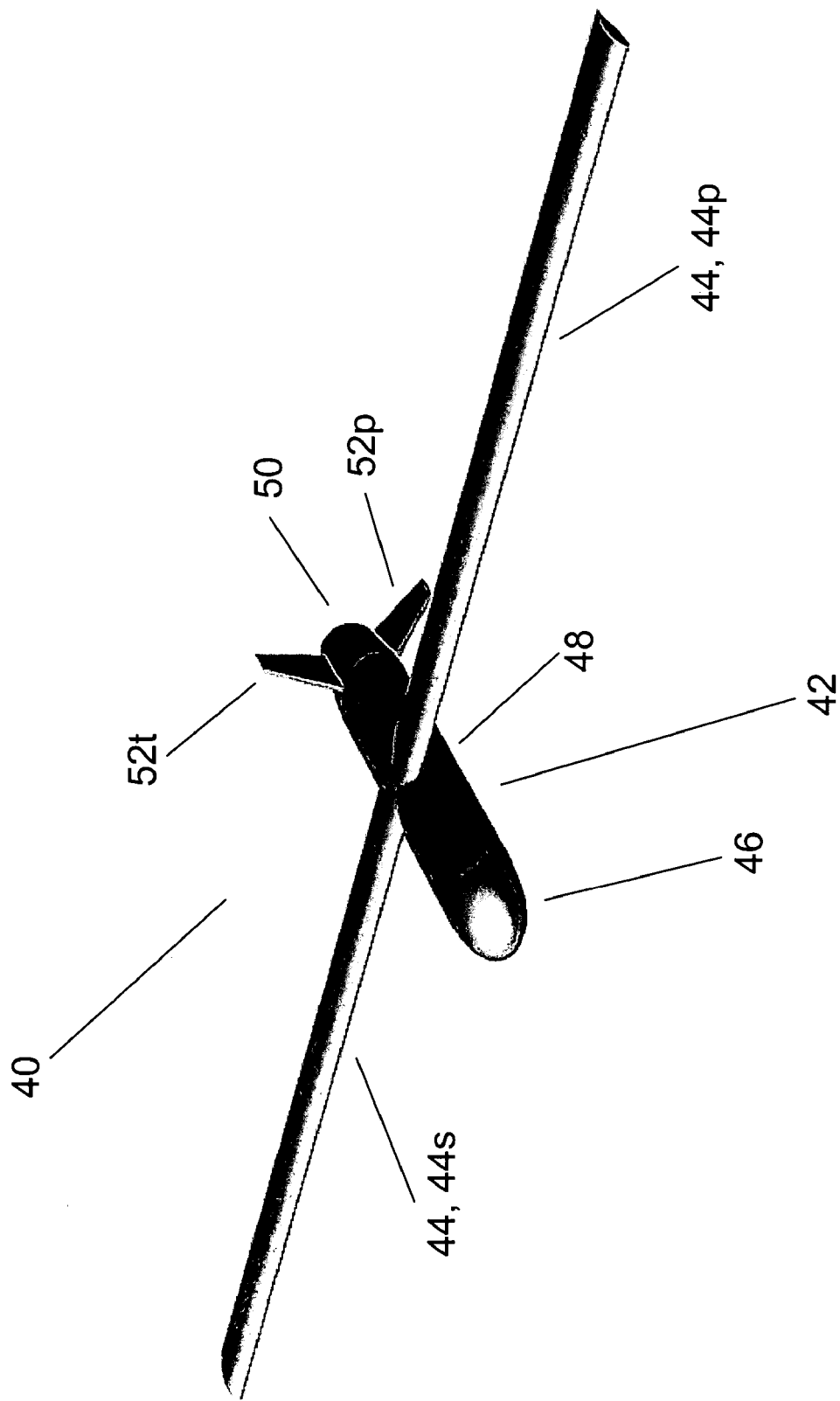
FIG. 1 is a perspective view of an embodiment, in accordance with the present invention, of a fully assembled unmanned aerial vehicle (UAV) with both its wings fully deployed.
Figure 2:
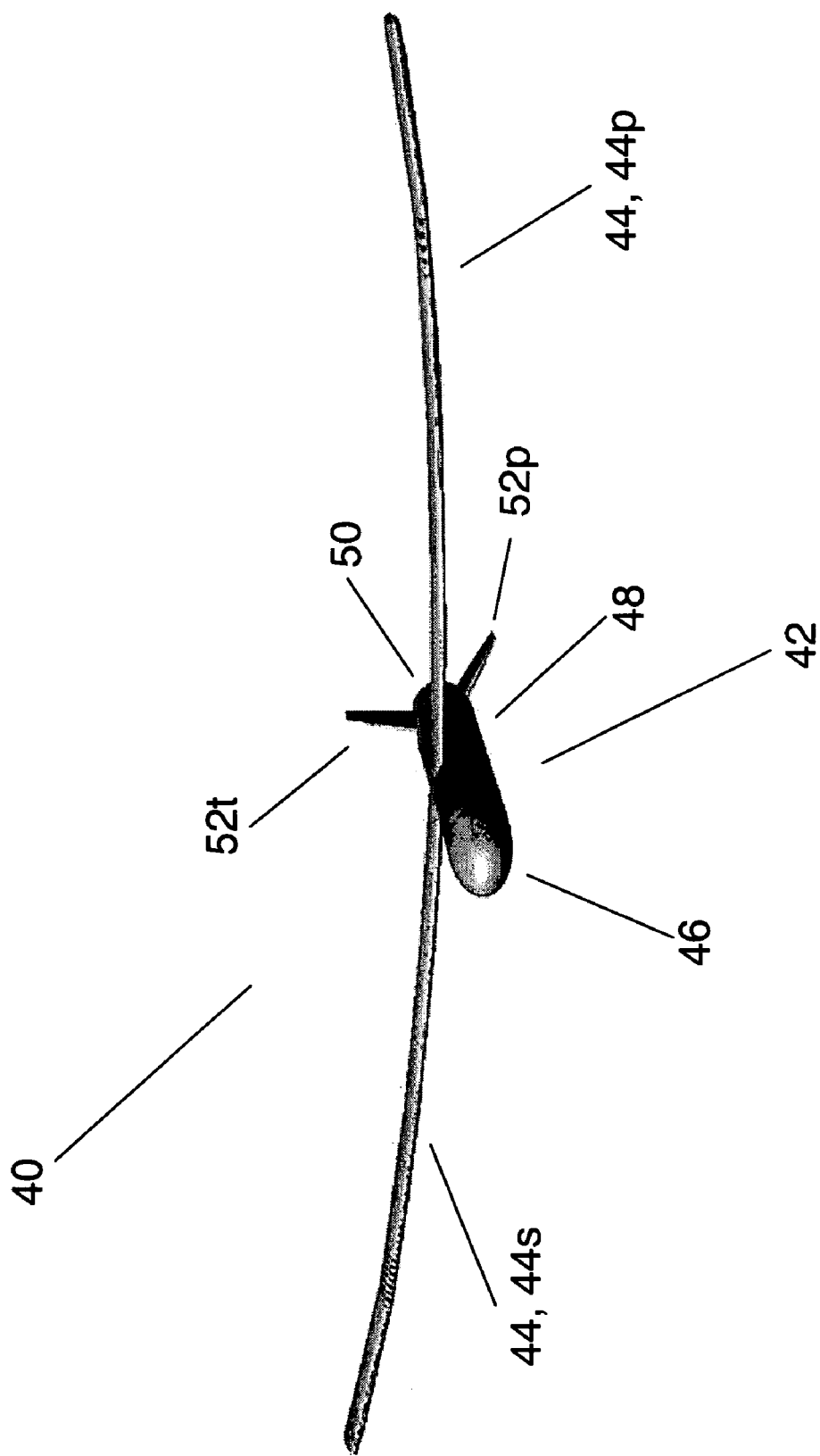
FIG. 2 is a perspective view, similar to FIG. 1, of the inventive embodiment shown in FIG. 1, wherein the wings are shown bent while the inventive UAV is in glide mode.
Figure 3:
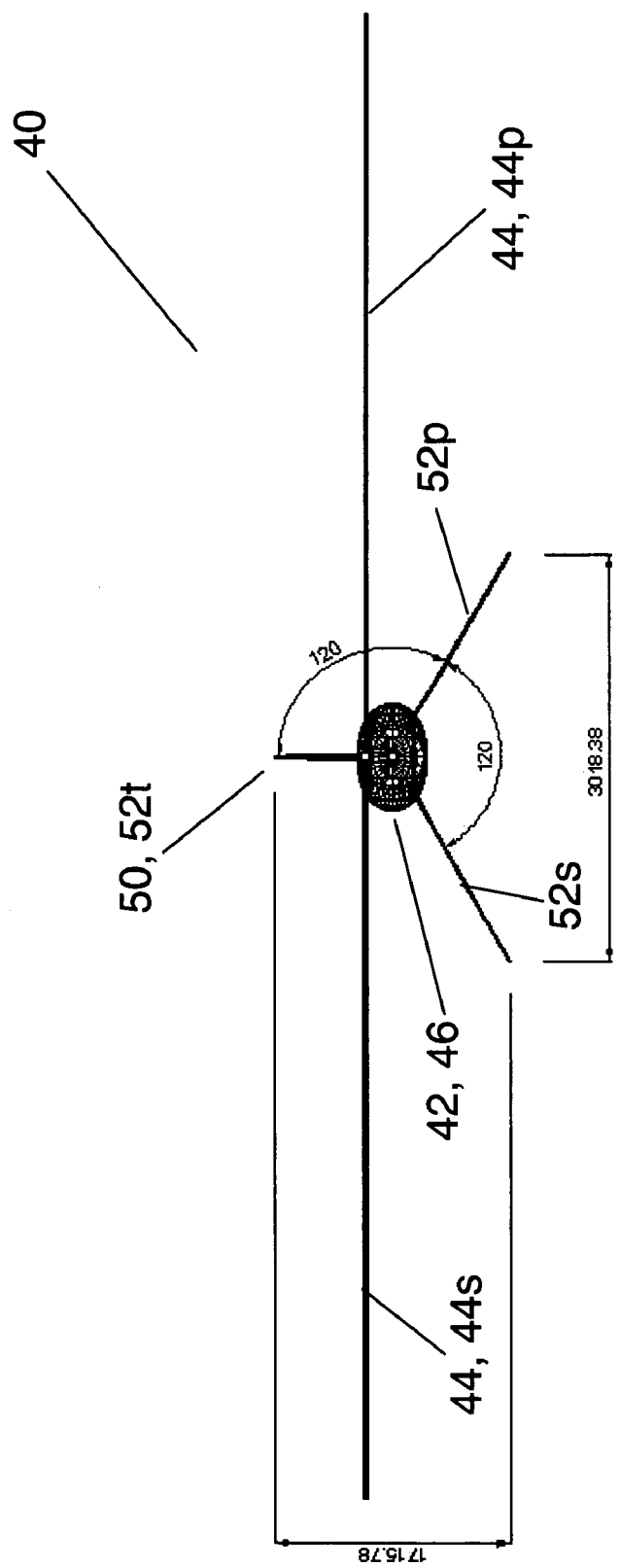
FIG. 3 is an elevation view of the inventive embodiment shown in FIG. 1.

Referring now to FIG. 1 through FIG. 3, inventive glider 40 is an unmanned, disposable, mass-producible, structural vehicle. At least substantially made of composite materials, inventive glider 40 is relatively lightweight, yet is sufficiently robust to withstand loads associated with launch (especially, rocket launch), flight, landing and carrying cargo. Inventive glider 40 is sufficiently versatile to accommodate different launch methodologies. It can support two-hundred-mile military logistics missions, and allows for range variations.

Inventive glider 40 includes a body 42 and a pair of wings (airfoils) 44, viz., port wing 44$p$ and starboard wing 44$s$. Body 42 includes three body sections, viz., a nose 46, a fuselage 48 and a tail 50. Fuselage 48 is attached flush to rounded nose 46 at the front end 74 of fuselage 48, and is attached flush to tail 50 at the back end 76 of fuselage 48. Tail 50, the entire empennage assembly, includes casing 96 and three stabilizers 52$p$, 52$s$ and 52$t$, circumferentially arranged at 120 degrees of separation as shown in FIG. 3. Wings 44 can also include control surfaces such as a pair of flaps and/or a pair of ailerons. Tail 50 can also include control surfaces such as a rudder or a pair of elevators.

Figure 4:
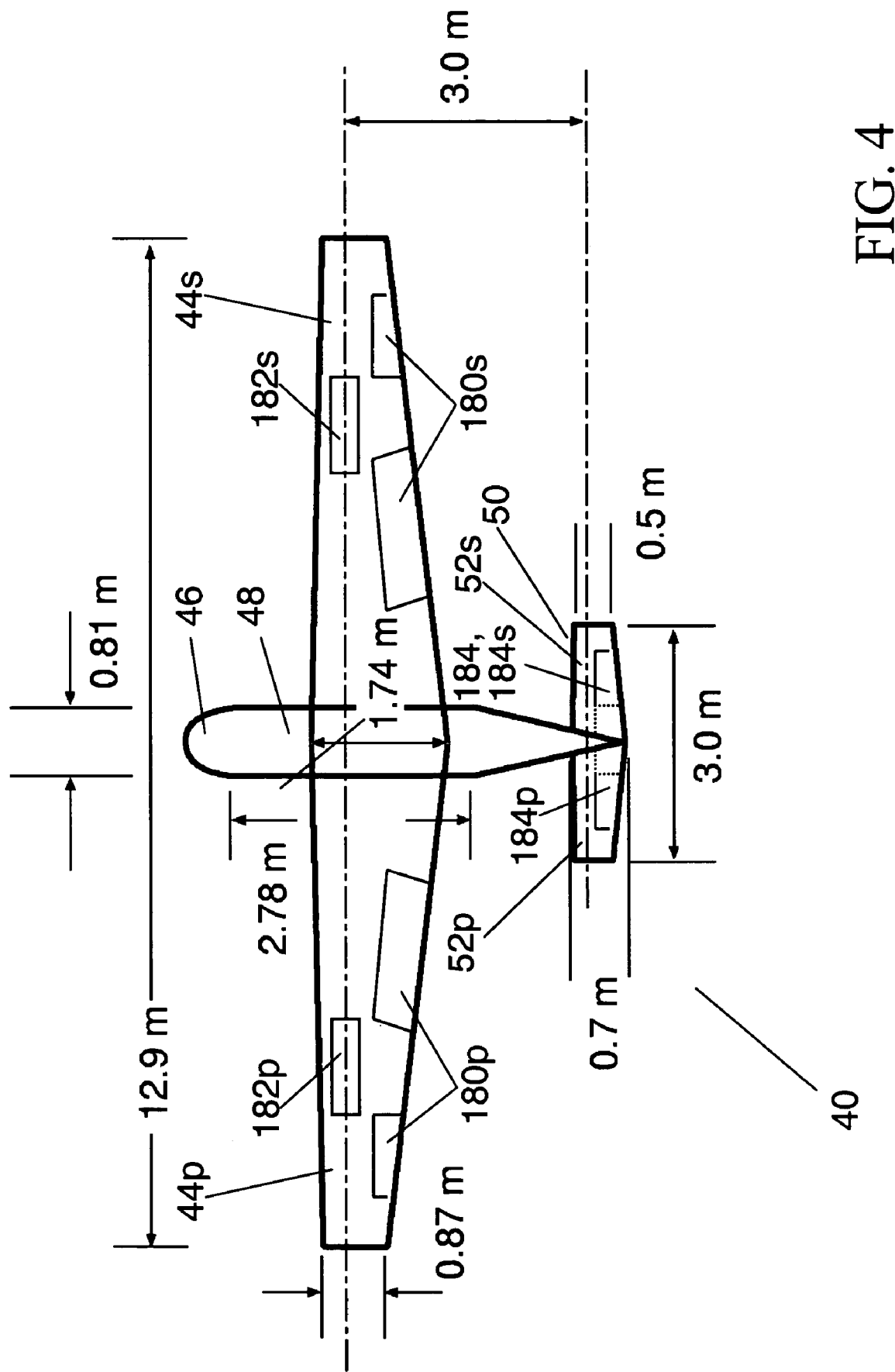
FIG. 4 is a plan view of another inventive embodiment of a fully assembled, fully deployed UAV, this embodiment being characterized by a slightly lower aspect ratio than characterizes the embodiment shown in FIG. 1.

Reference is now made to FIG. 4 and FIG. 5, which pertain to an inventive embodiment having a geometry that differs from that shown in FIG. 1 through FIG. 3. In inventive practice, the stabilizers 52 need not be arranged 120 degrees apart such as shown in FIG. 3, representative of a "rocket/missile-style" stabilizer arrangement which is especially suitable for inventive ALDS embodiments involving a rocket 170 launch of glider 40. Instead, for instance, stabilizers 52$p$ and 52$s$ can be horizontal stabilizers while stabilizer 52$t$ (similarly as shown in FIG. 3) is a vertical stabilizer. Particularly significant among the vehicle design (e.g., configurational and aerodynamic) characteristics presented in FIG. 5 are the gross weight, the wingspan and the aspect ratio. The rate of descent at best glide speed may be less critical than some other design characteristics in inventive practice. According to many inventive embodiments, these and other characteristics will to some degree be similar to those of many recreational sailplanes. The inventive glider 40 shown in FIG. 4 has an overall length of about 13.5 feet, based on a fuselage length of about 9 feet, a nose length of about 1.5 feet, and a tail length of about 3 feet. As distinguished from the inventive glider 40 shown in FIG. 4, the inventive glider 40 shown in FIG. 1 through FIG. 3 features a more slender wing design. A typical embodiment of the inventive glider depicted in FIG. 1 through FIG. 3 will have a span of 36 feet, a length of 13 feet, a gross weight of 1,500 pounds, a wing area of 118.4 square feet, and an aspect ratio of 11.

Sailplanes have been manufactured with aspect ratios roughly varying between about eight and about forty, some even higher. Generally speaking, higher aspect ratios will tend to improve gliding capabilities (e.g., gliding distances), especially by reducing induced drag associated with wing tip vortices. The aspect ratio of 9.9, indicated in FIG. 5, is consistent with an aspect ratio on the order of ten, a minimum value characterizing some sailplanes. Known in the art are the important design considerations for glider aircraft, such as taught by the following definitive textbook (translated by joint inventor Judah H. Milgram), incorporated herein by reference: Fred Thomas, *Fundamentals of Sailplane Design*, Judah Milgram, translator, 3$^{rd}$ edition, College Park Press, College Park, Md., 01 Sep. 1999. In the light of the instant disclosure, known glider design principles such as disclosed by Thomas can be successfully brought to bear in a variety of contexts by the ordinarily skilled artisan who seeks to practice the present invention.

Figure 15:
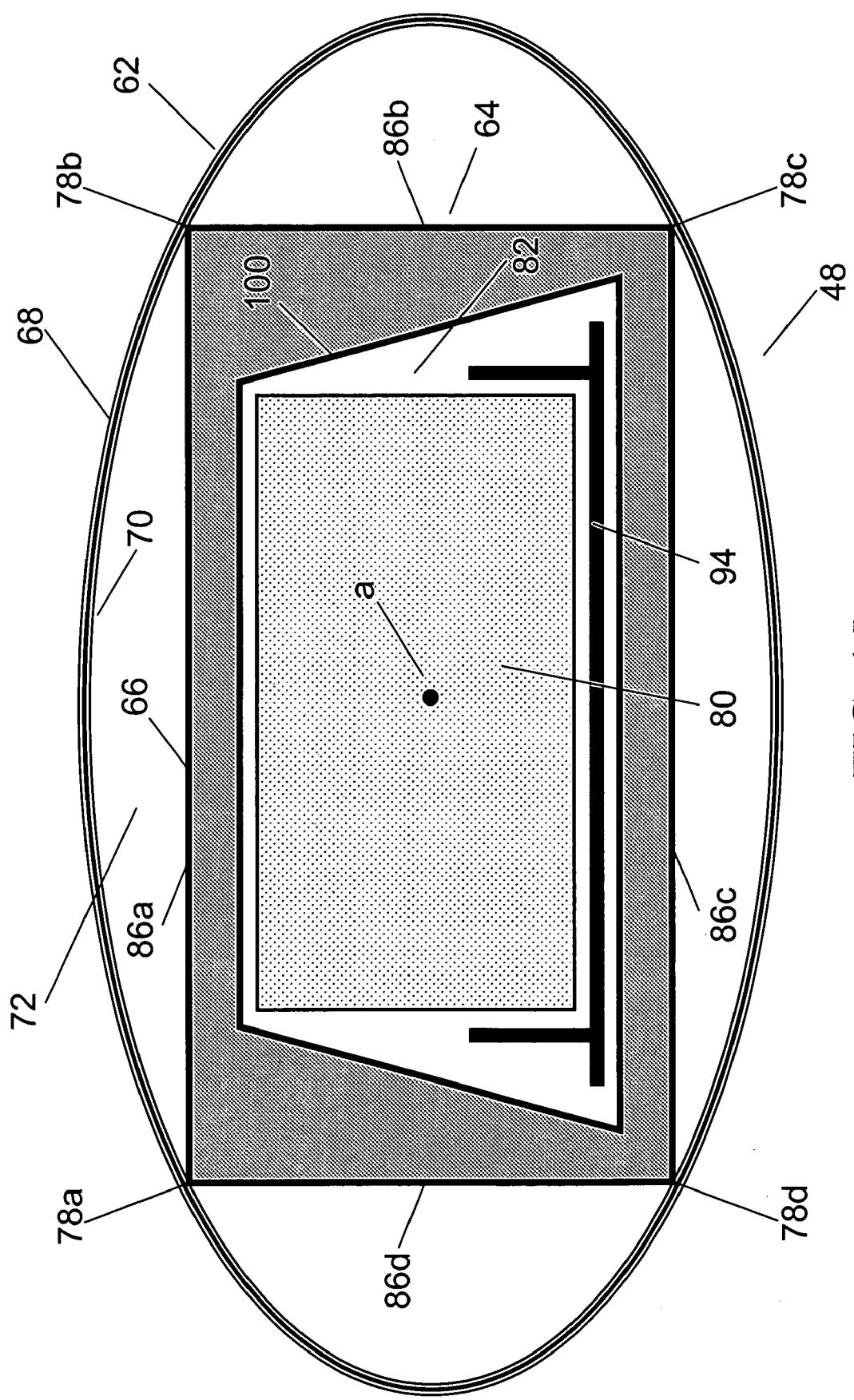
FIG. 15 is a cross-sectional elevation end view of a fuselage such as that shown in FIG. 9, illustrating the union of the cylindrical shell and the box-shaped container wherein the longitudinal edges of the box-shaped container are touching the inside surface of the cylindrical shell, also illustrating how the trapezoidal cross-sectional shape of the box-shaped container's interior space facilitates, in combination with a railing assembly, the introduction of conformal box-shaped compartments into the box-shaped container's interior space.
Figure 16:
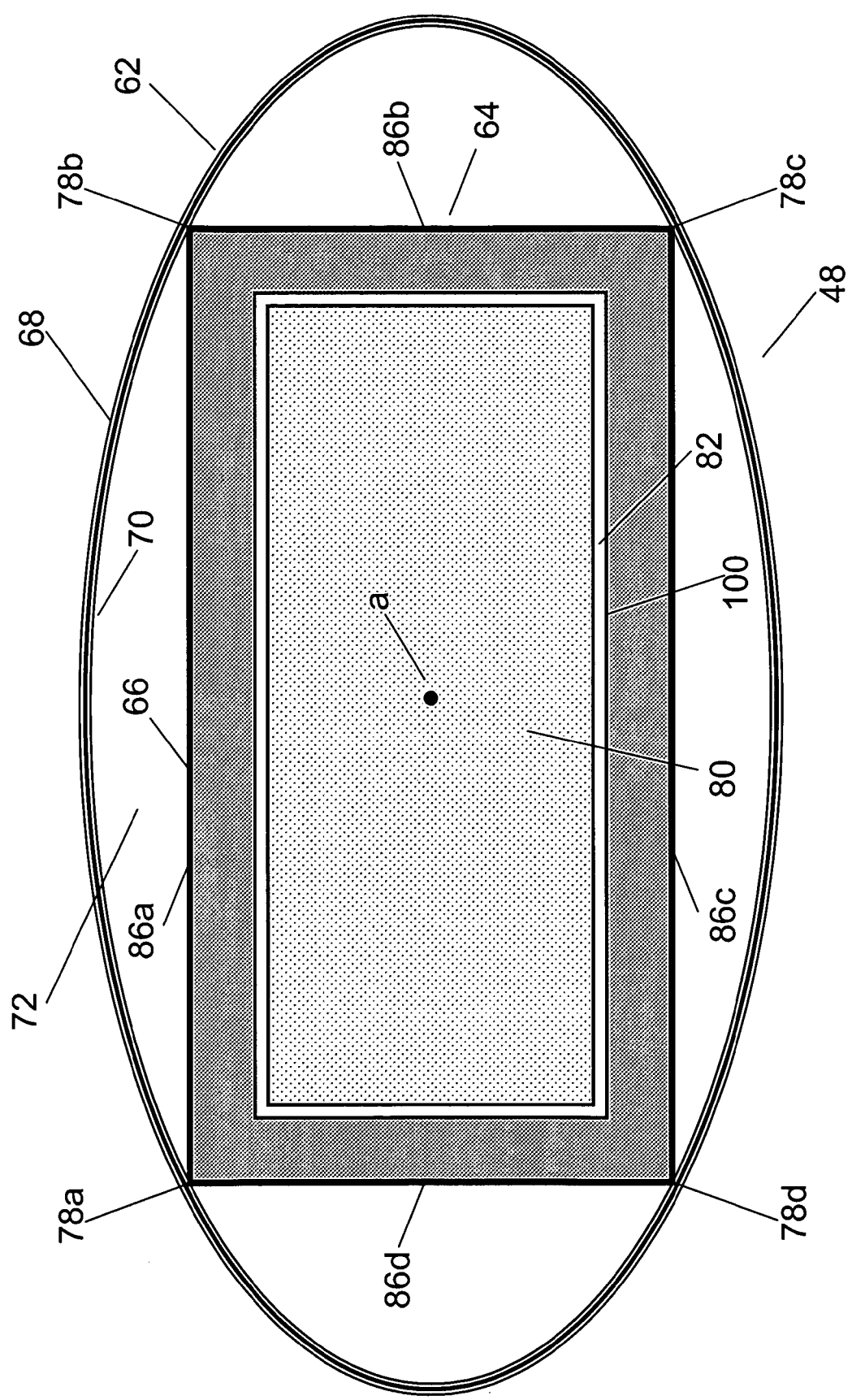
FIG. 16 is a cross-sectional elevation end view, similar to the view shown in FIG. 15, of a fuselage such as shown in FIG. 9, illustrating the union of the fuselage shell and the box-shaped container wherein the longitudinal edges of the box-shaped container are touching the inside surface of the cylindrical shell, also illustrating how conformal box-shaped compartments can be introduced into the box-shaped container's interior space in the absence of facilitative mechanism such as that shown in FIG. 15.

With reference to FIG. 6 through FIG. 16, fuselage 48 includes a hollow cylindrical shell 62 and a hollow box-shaped storage container 64. The geometric shape defined by the exterior surface 66 of container 64 can be synonymously described as a rectangular prism or a rectangular parallelepiped. The exterior surface 68 and the interior surface 70 of fuselage shell 62 each describe a cylindrical geometric shape. The interior surface 100 of fuselage shell 62 circumscribes the interior void 72 of fuselage shell 62, the shell void 72 running axially-longitudinally through the interior of fuselage shell 62. The interior surface 72 of container 64 can describe a rectangular prism (rectangular parallelepiped) shape (e.g., as shown in FIG. 16) or another shape such as a regular trapezoidal prism shape (e.g., as shown in FIG. 15). According to inventive principles, the design of fuselage shell 62 will entail consideration mainly of its aerodynamic purpose and its structural purpose. That is, shell 62 not only constitutes an aerodynamic fairing for container 64, but also constitutes a structural component that, in combination with container 64, results in a fuselage 48 having a requisite degree of structural integrity.

The terms "cylinder," "cylindrical," "cone" and "conical," as used herein, are defined herein in accordance with their broadest accepted meanings. The terms "cylinder" and "cylindrical" refer to any geometric surface generated by a straight line ("generatrix") moving parallel to a fixed straight line and intersecting a fixed closed plane curve ("directrix"), wherein the fixed straight line is neither on nor parallel to the plane of the directrix. Otherwise expressed, a cylindrical surface is traced out by the generatrix, which moves parallel to itself and always passes through the directrix. The terms "cone" and "conical," as used herein, refer to any geometric surface generated by a straight line ("generatrix") passing through a fixed point ("vertex") and intersecting a fixed closed plane curve ("directrix"), wherein the fixed point is not on nor parallel to the plane of the directrix.

The terms "ellipse" and "elliptical" are intended herein to be descriptive in an approximative and inclusive geometric sense rather than in the strictest geometric sense. The terms "ellipse and elliptical," as used herein, refer to any closed plane curve wherein the sum of the distances of each point on the closed plane curve from two fixed points (the "foci") is the same constant, or is approximately, generally or nearly so. As defined herein, the terms "ellipse" and "elliptical" subsume circularity. Technically speaking, the terms "circle" and "circular" denote equidistance everywhere of a closed plane curve from a fixed point (the "center"). As intended herein, a circle is a type of ellipse wherein the two foci are practically coincident, thus effectively representing a "center." In other words, an "ellipse" as intended herein can be essentially characterized by "roundness" (having a shape like a circle) or by "ovalness" (having a shape like a stretched circle). Of course, ellipses and circles meeting their strict mathematical definitions necessarily meet the less strict definition of "ellipse" adopted herein. The term "ellipsoid" refers herein to a closed three-dimensional geometric surface all of the plane sections of which are "ellipses" as defined herein.

According to usual inventive practice, the directrix of the cylindrical fuselage shell 62 describes a shape—whether circular or noncircular, elliptical or non-elliptical—that is characterized by symmetry either with respect to the center point of the closed planar curve, or with respect to a line bisecting the center point of the closed planar curve. The cylinder can be a "right" cylinder (i.e., the cylindrical shape is a "right" cylindrical shape), referring to the movement of the directrix so as to be perpendicular to the plane of the directrix; or, the cylinder can be an "oblique" cylinder (i.e., the cylindrical shape is an "oblique" cylindrical shape), referring to the movement of the directrix so as to be oblique (non-perpendicular) with respect to the plane of the directrix.

According to typical inventive practice, the directrix describes an elliptical shape, either circular or non-circular. A non-circular elliptical cylindrical fuselage shell 62 has an elliptical cross-section, such as shown in FIG. 1, FIG. 2, FIG. 3, FIG. 9, FIG. 15 and FIG. 16. Fuselage shell 62 is shown in the figures herein to describe a hollow, open-ended elliptical cylinder. The exterior surface 68 and the interior surface 70 of fuselage shell 62 each describe a cylindrical geometric shape that is non-circularly elliptical, the respective outer and inner elliptical shapes being geometrically similar to each other. Fuselage shell 62 is symmetrical about longitudinal geometric axis a, the imaginary axis of symmetry generally described by body 42. Fuselage shell 62 is open at both of its longitudinal ends 74 and 76. In the light of the instant disclosure, the ordinarily skilled artisan will readily envision the endless possibilities for the cross-sectional shape, circular and non-circular, of elliptically cylindrical fuselage shell 62.

Figure 10:
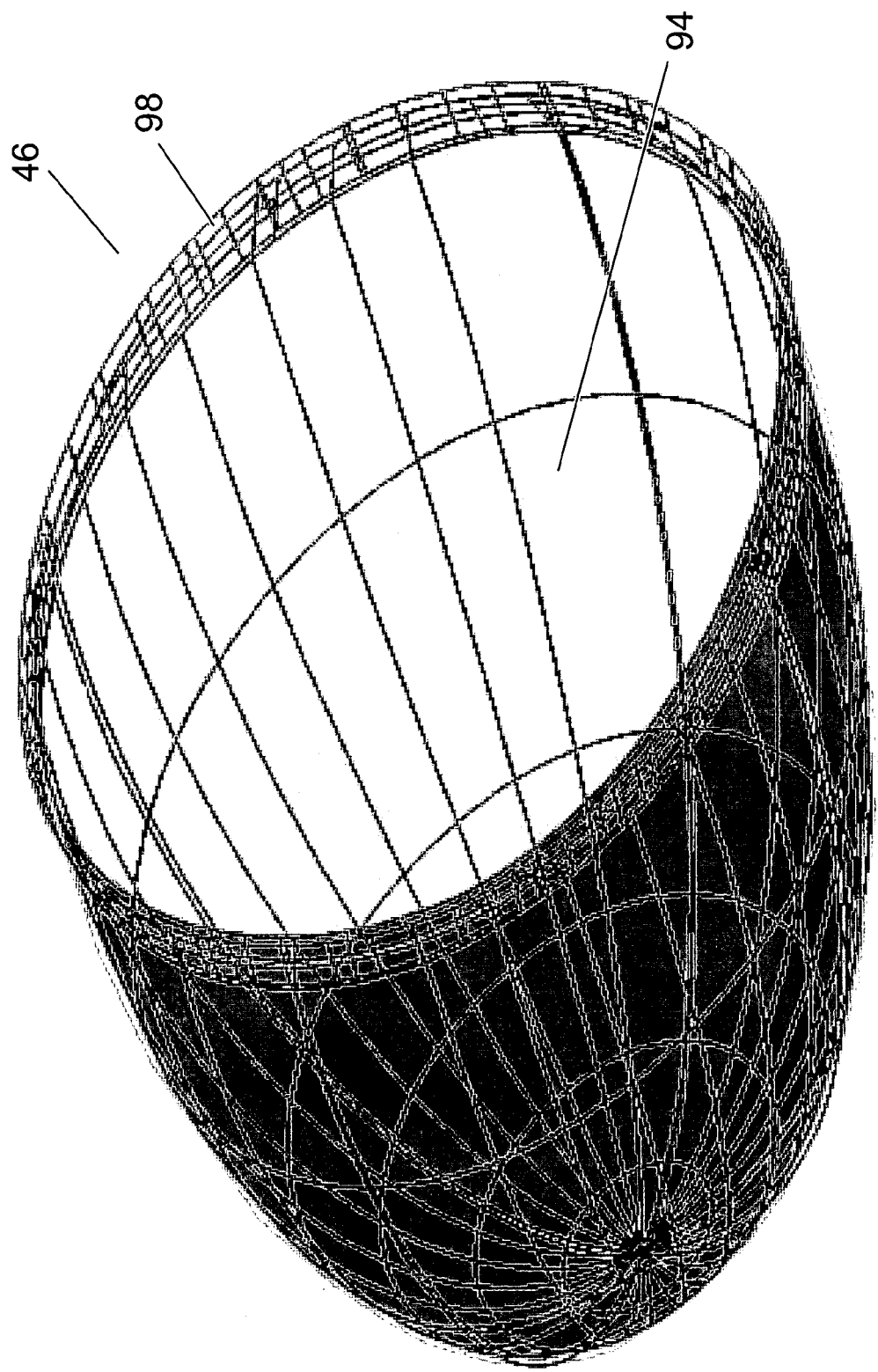
FIG. 10 is a computer-generated perspective view of the rounded nose of the inventive UAV shown in FIG. 1.

As shown in FIG. 10, nose 46 has a non-circular elliptical cross-section. Nose 46 describes the shape of an extreme three-dimensional section of an ellipsoid. Nose 46 is symmetrical about longitudinal geometric axis a. In the light of the instant disclosure, the ordinarily skilled artisan will readily envision the endless possibilities for the cross-sectional shape, circular and non-circular, of sectionally ellipsoidal nose 46. Some inventive embodiments provide for a less rounded shape of nose 46 than that shown in FIG. 10, e.g., a more pointed shape akin to that of a rocket's or missile's "nose cone. In fact, it is possible to practice the present invention so that nose 46 has a conical or near-conical shape closely resembling that of many rockets or missiles.

Figure 11:
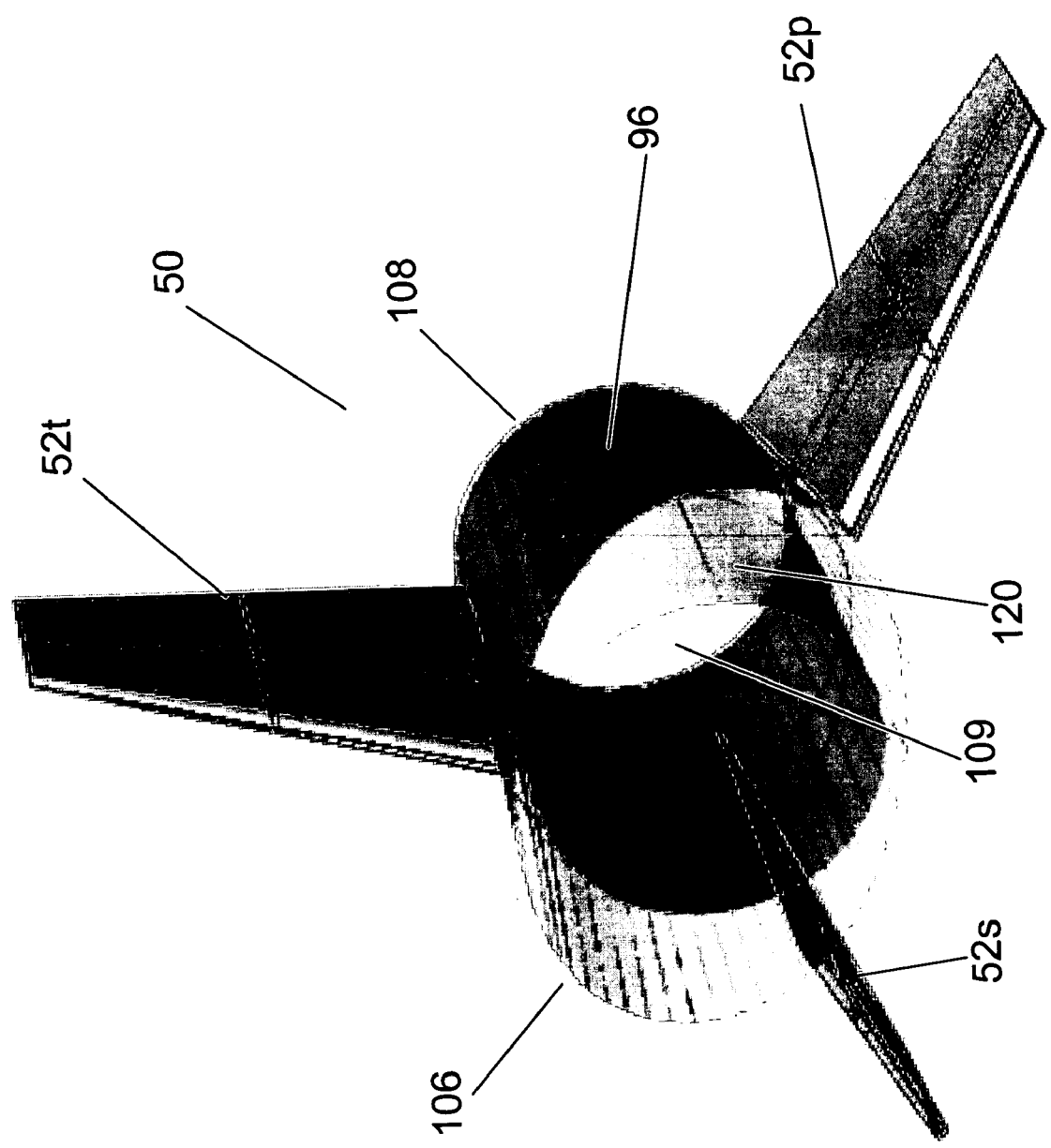
FIG. 11 is a computer-generated perspective view of the tri-airfoil tail (empennage) of the inventive UAV shown in FIG. 1.
Figure 12:
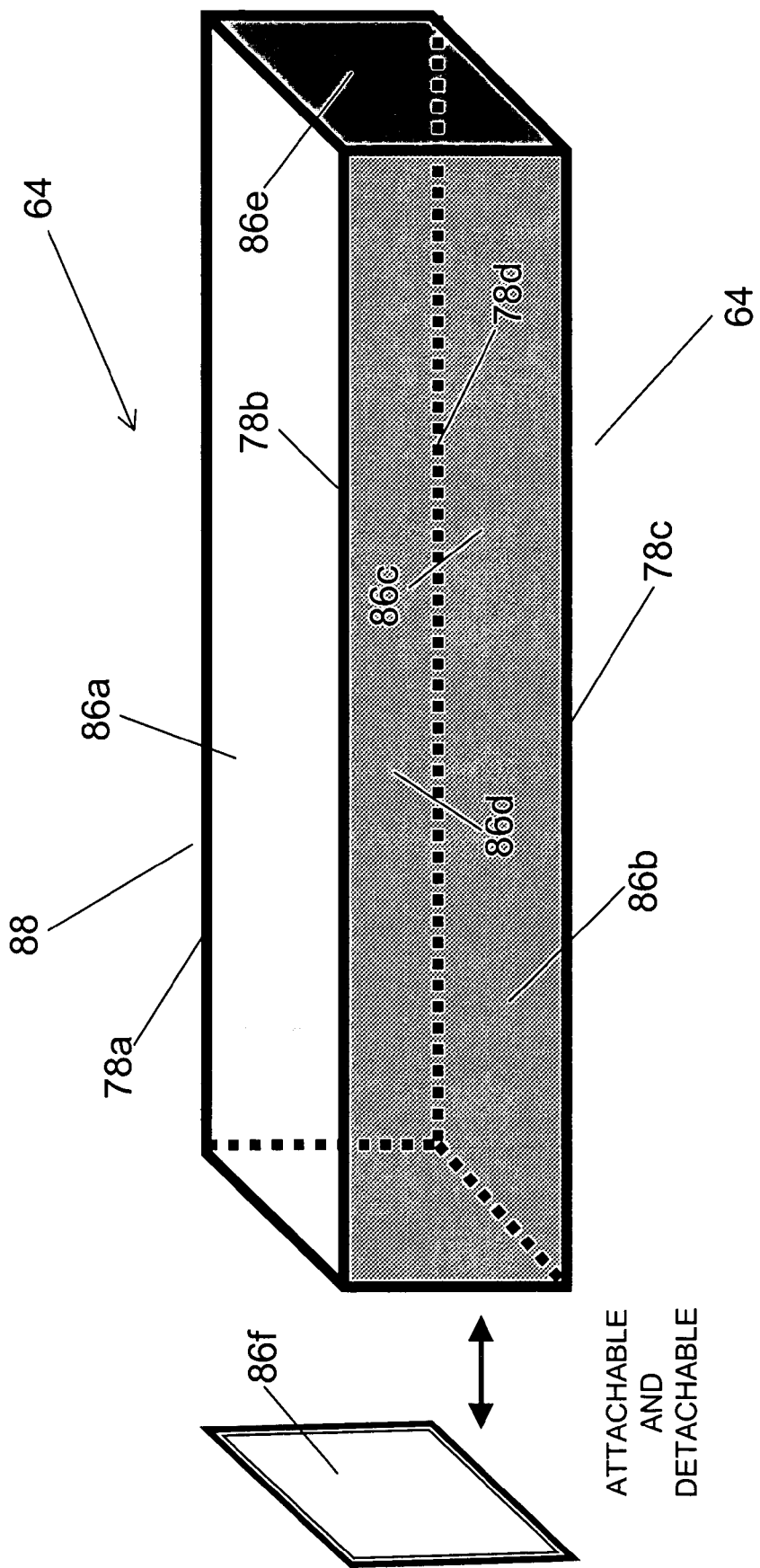
FIG. 12 is a perspective view of a box-shaped container such as that shown in FIG. 8, particularly illustrating the coupling and uncoupling of the container's end face with respect to the rest of the container.

As shown in FIG. 11, casing 96 of tail 50 has the shape of a non-extreme three-dimensional section of an elliptical cone, casing 96 as shown having a non-circular elliptical cross-section. Tail casing 96 is shown in FIG. 4 to have a cone shape. Tail casing 96 is symmetrical about longitudinal geometric axis a. In the light of the instant disclosure, the ordinarily skilled artisan will readily envision the endless possibilities for the cross-sectional shape, circular and non-circular, of a conical or sectionally elliptically conical tail casing 96.

As illustrated in FIG. 6, FIG. 7, FIG. 9, FIG. 15 and FIG. 16, in the fully assembled fuselage 48, fuselage shell 62 is coupled with and encloses storage container 64, which is situated in the interior void 72 of fuselage shell 62. Fuselage shell 62 represents a kind of aerodynamic "fairing" for storage container 64. Fuselage shell 62 and storage container 64 are each symmetrical with respect to the same longitudinal geometric axis a. The horizontal long diameter of the shell 62 elliptical cross-section coincides with the horizontal long bisector of the container 64 rectangular cross-section; the vertical short diameter of the shell 62 elliptical cross-section coincides with the vertical short bisector of the container 64 rectangular cross-section.

Shell 62 and container 64 together represent an integral structure. Storage container 64 has twelve exterior edges including four longitudinal edges, viz., 78*a*, 78*b*, 78*c* and 78*d*. Fuselage shell 62 encloses storage container 64 so that the four longitudinal edges 78 of storage container 64 are contiguous with the interior surface 70 of fuselage shell 62, storage container 64 thereby lending a significant degree of structural support to fuselage shell 62. For the vast majority of inventive embodiments, the combination of shell 62 and container 64 will be structurally "fixed" by virtue of the interrelationship of their respective geometries. A notable exception to this generalization is the combination of a circularly cross-sectioned shell 62 and a squarely cross-sectioned container 64, a combination that would possibly lend itself to relative rotation of shell 62 and container 64 about the longitudinal geometric axis of symmetry a.

Fuselage shell 62 and storage container 64 are shown herein to be longitudinally coextensive; that is, the front end 74 and the back end 76 of fuselage shell 62 are even, respectively, with the front end face 86*e* and the back end face 86*f* (or the front end face 86*f* and the back end face 86*e*) of storage container 64. Nevertheless, in accordance with inventive principles, it is neither essential that shell 62 and container 64 have equal lengths, nor essential that one or both ends of fuselage 48 be characterized by evenness of shell 62 and container 64. Depending on the inventive embodiment, storage container 64 can be shorter than, equal to, or greater than fuselage shell 62. According to most inventive embodiments, storage container 64 will be equal in length or shorter than fuselage 62, and will fall within the length of the fuselage shell 62. Nevertheless, according to some inventive embodiments, container 64 will be longer than shell 62, and/or will protrude from at least one end of shell 62.

Fabrication of fuselage 48 can involve the use of any of various known techniques for making composite structures. For instance, shell 62 and container 64 can be separately manufactured to suitable tolerances, and then coupled by fitting container 64 inside of shell 62. Shell 62 can be made using composite manufacture techniques such as filament winding or extrusion. Container 64 can be made using composite manufacture techniques such as resin transfer molding (RTM). It is also possible to create shell 62 directly around container 64, such as by providing four removable mandrel sections and placing them adjacent to container side (lengthwise) faces 86*a*, 86*b*, 86*c*, 86*d* (thereby forming the desired inside cylindrical shape of the shell 62), filament winding composite material around the crafted mandrel, and removing the four mandrel sections.

Storage container 64 thus has two primary functions. Firstly, storage container 64 is suitable for containing cargo—i.e., any of a variety of objects. Secondly, storage container 64 lends structural strength to fuselage 48 specifically and to inventive glider 40 generally. The container's propitious structural influence on the fuselage's structure strength may be furthered as the cross-sectional shape of the shell more closely approximates a "purely" circular or "purely" elliptical shape ("purely" in terms of their strict mathematical definitions), as the structural engineering associated with the symmetrical balance drawn between the shell and the container may tend to be more favorable as the shell's cross-sectional shape approaches circular or elliptical purity. In addition, the container's augmentation of the fuselage's structural strength may be enhanced by the presence of cargo within storage container 64, especially when the cargo includes modules such as box-shaped (rectangular prism or rectangular parallelepiped) storage compartments 80, particularly well shown in FIG. 8 and FIG. 13 through FIG. 16.

Storage compartments 80 are conformal with respect to the interior surface 72 of storage container 64. As shown in FIG. 13 through FIG. 16, each storage compartment 80 has an interior storage space 84 and, on the exterior, is dimensionally and geometrically compatible with storage container 64. By virtue of this configurational concordance, a compartment 80 that is introduced within container space 82 (i.e., inside interior container surface 72) will directly lend structural strength to storage container 64, and hence will indirectly lend structural strength to fuselage 48. The imparting by the compartments 80 of structural strength will tend to increase in accordance with increasing numbers of compartments 80 and increasing extents to which compartments 80 fill or occupy container space 82. Optimal contribution of structural strength by compartments 80 may occur when compartments 80 are stacked end-to-end (between front end 74 and back end 76) within container space 82 so as to completely or nearly completely occupy container space 82. Furthermore, this kind of structural enhancement by the compartments 80 may be especially manifest when the compartments 80 themselves are stuffed with cargo (and hence strengthened thereby) within their respective compartment spaces 84.

Storage container 64, exteriorly shaped like a rectangular parallelepiped or rectangular prism, is a six-faced (six-sided) box-like structure that forms a closed figure on five exterior faces, viz., container side faces 86a, 86b, 86c, 86d and container end face 86e. Each edge 78 is the junction formed by two adjacent faces 86. In addition to the integral portion formed by faces 86a, 86b, 86c, 86d and 86e, storage container 64 has an attachable (installable) and detachable (un-installable) sixth face, viz., container end face 86f. According to inventive practice, the attachable/detachable container end face 86f can be positioned at either the front longitudinal end 74 or the back longitudinal end 76 of fuselage 48. Particularly referring to FIG. 12, the attachable/ detachable container end face 86f is an independent piece that can be secured to the integral main portion 88 of container 64 and removed therefrom, using various techniques such as those implementing screws, bolts, clips, latches or adhesives. Some inventive embodiments provide for an attachable/detachable container end face 86f that is not completely separable from the integral main portion 88 of container 64, but remains associated (e.g., via a hinge in a manner such as shown for compartment 80 in FIG. 14) and is fastenable or otherwise securable. Some inventive embodiments provide for two attachable/detachable container end faces (e.g., end faces 86e and 86f), one at each end of container 64.

The interior space 82 of container 64 is useful for housing one or more compartments 80. Container 64 can be opened via removal of its end face 86f, then totally or partially filled inside its space 82 with modular compartments 80 containing supplies, and then closed (sealed) via replacement of its end face 86f. Spacing, separating or insulating members such as partition 90 can be suitably utilized for filling, distributing or protecting the cargo. Partition 90 is shown to have a rectangular box shape analogous to that of the compartments 80. The entire interior space 82 of storage container 64 can be filled with storage 80 compartments (or with some combination of storage compartments 80 and partitions 90) that are longitudinally stacked in such a way as to effectively constitute an integral structure that furthers the structural enhancement that storage compartment 80 affords fuselage shell 62. In such a manner, container 64 can be "compartmentalized" so as to hold diverse entities such as munitions, food, water and fuel. The partitions 90 can be used for separating adjacent dissimilar compartments 80 for sanitary or other reasons (e.g., to separate food from fuel).

Each individual compartment 80 is a robust rectangular box (shaped like a rectangular parallelepiped or rectangular prism) that can be opened, filled with objects (e.g., supplies), and closed. Compartments 80 each have an exterior compartment surface 81 that is compatible with the interior container surface 100. Many inventive embodiments provide for compartments 80 made of strong yet light composite material. It may be more efficient in some inventive applications to prepackage the compartments 80. As exemplified in FIG. 14, a compartment 80 can be a six-faced (six-sided) box structure, similar to a cigar box, which forms a closed figure on five faces (92a, 92b, 92c, 92d, 92e) and has a sixth face, lid 92f, that is pivotable, rotatable or swingable such as via hinge 91. The six faces 92 define exterior compartment surface 81 on the outside and interior compartment surface 83 on the inside. No elaborate latching mechanism for compartments 80 would be required according to most inventive embodiments.

Figure 6:
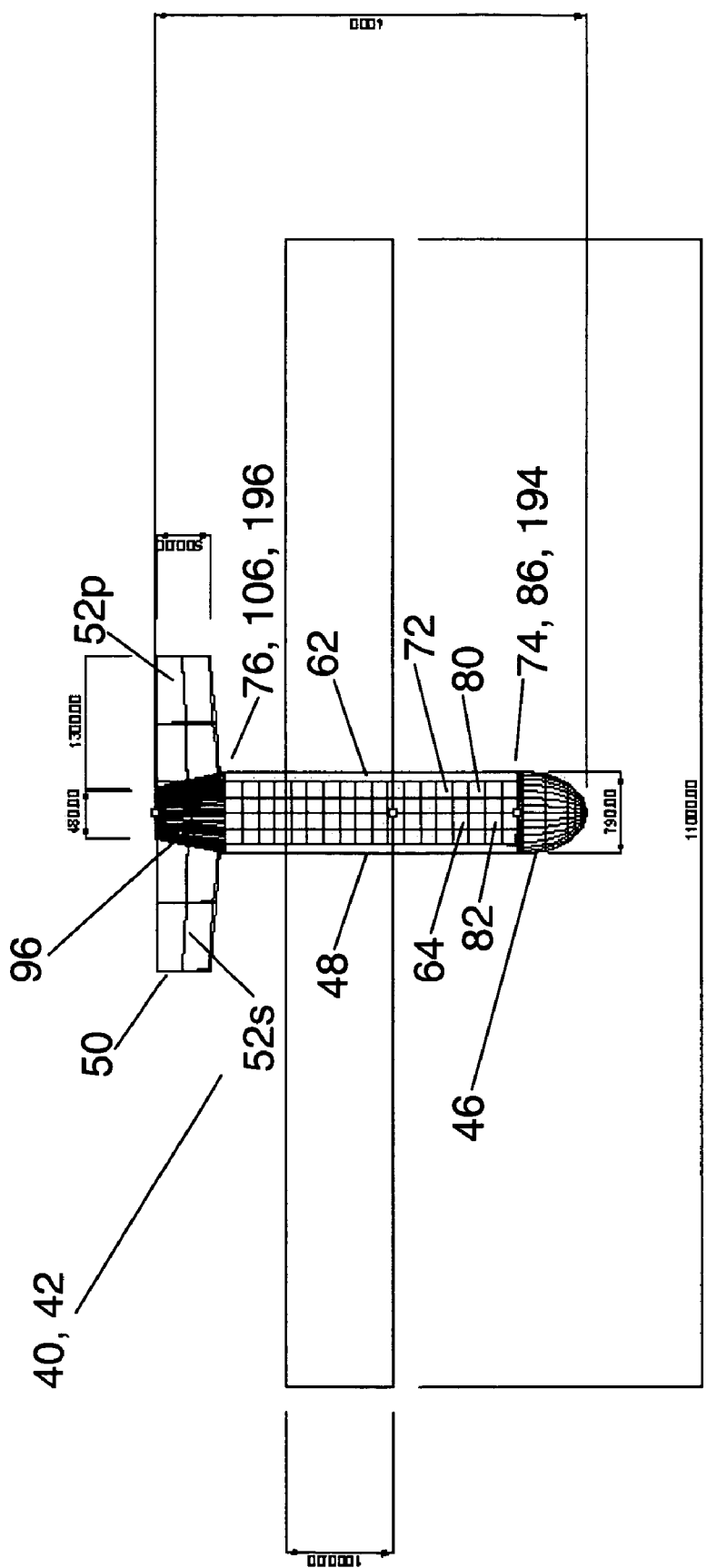
FIG. 6 is a cross-sectional plan view of the body of the inventive UAV shown in FIG. 1, particularly illustrating the box-shaped container that forms part of the fuselage.
Figure 7:
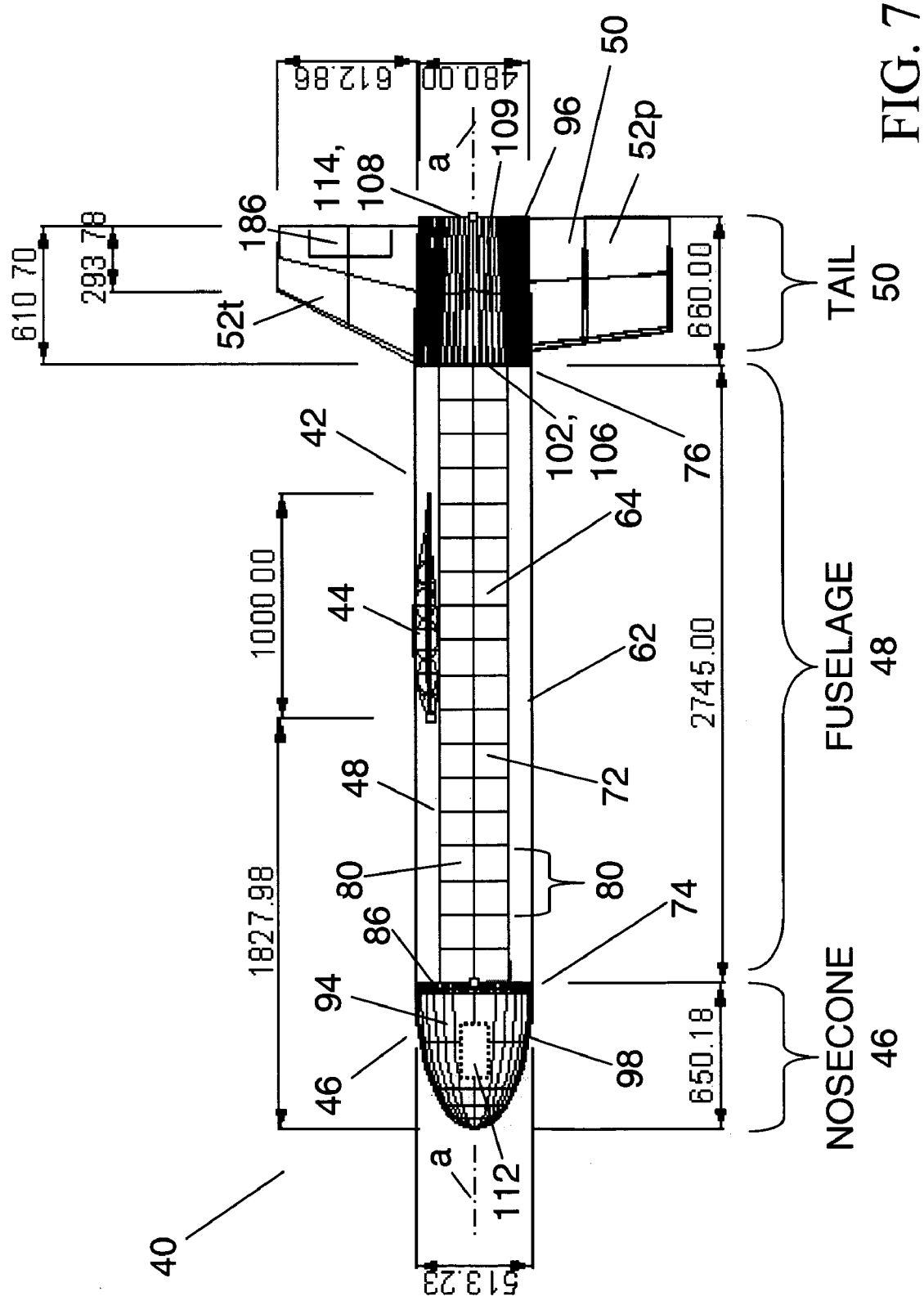
FIG. 7 is a cross-sectional elevation view of the body of the inventive UAV shown in FIG. 1, like FIG. 6 illustrating the box-shaped container that forms part of the fuselage, also showing the wings in an un-deployed condition.
Figure 8:
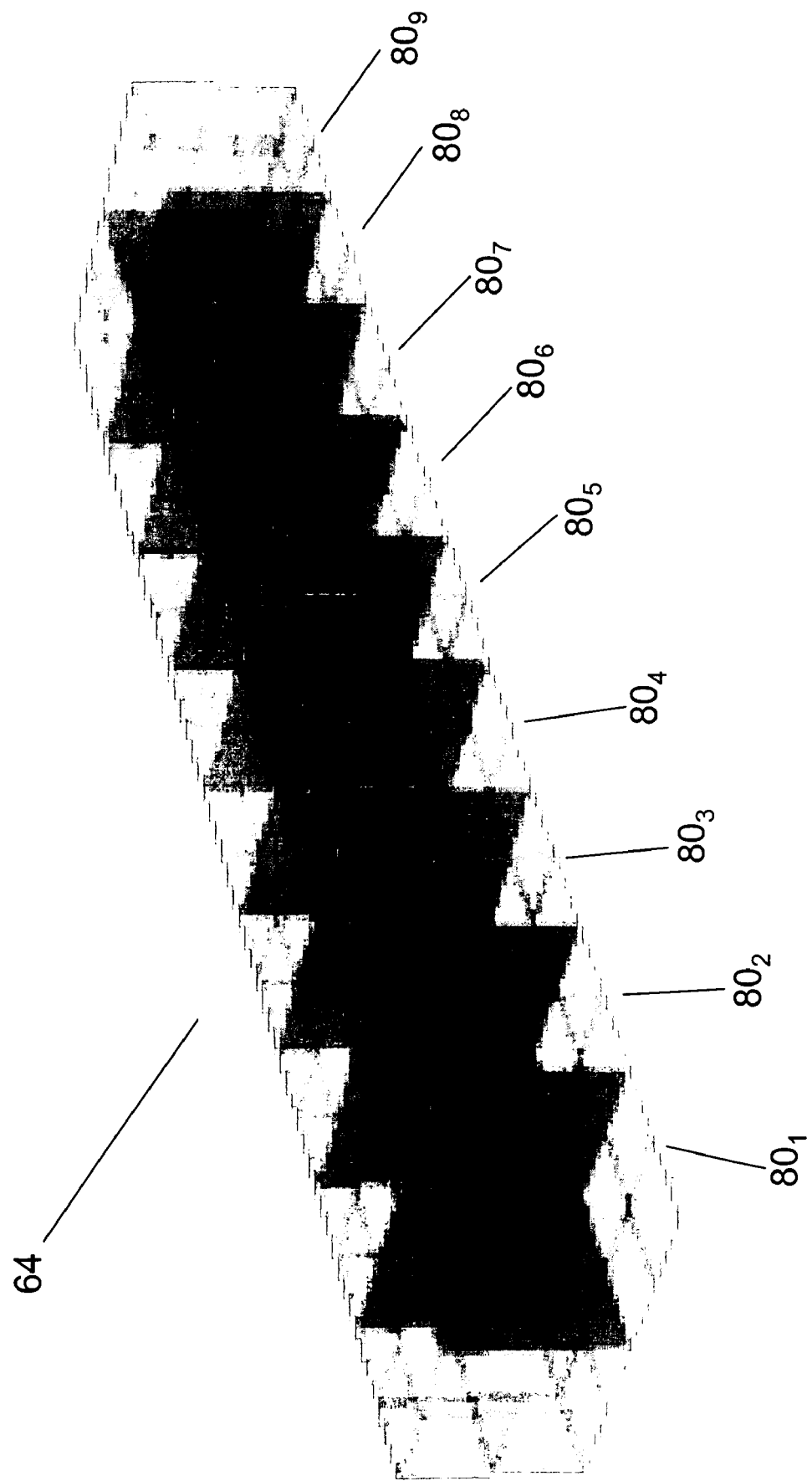
FIG. 8 is a computer-generated perspective view of the box-shaped container shown in FIG. 6, wherein geometric lines illustrate dimensions of the box-shaped storage compartments that are housed inside the box-shaped container.
Figure 9:
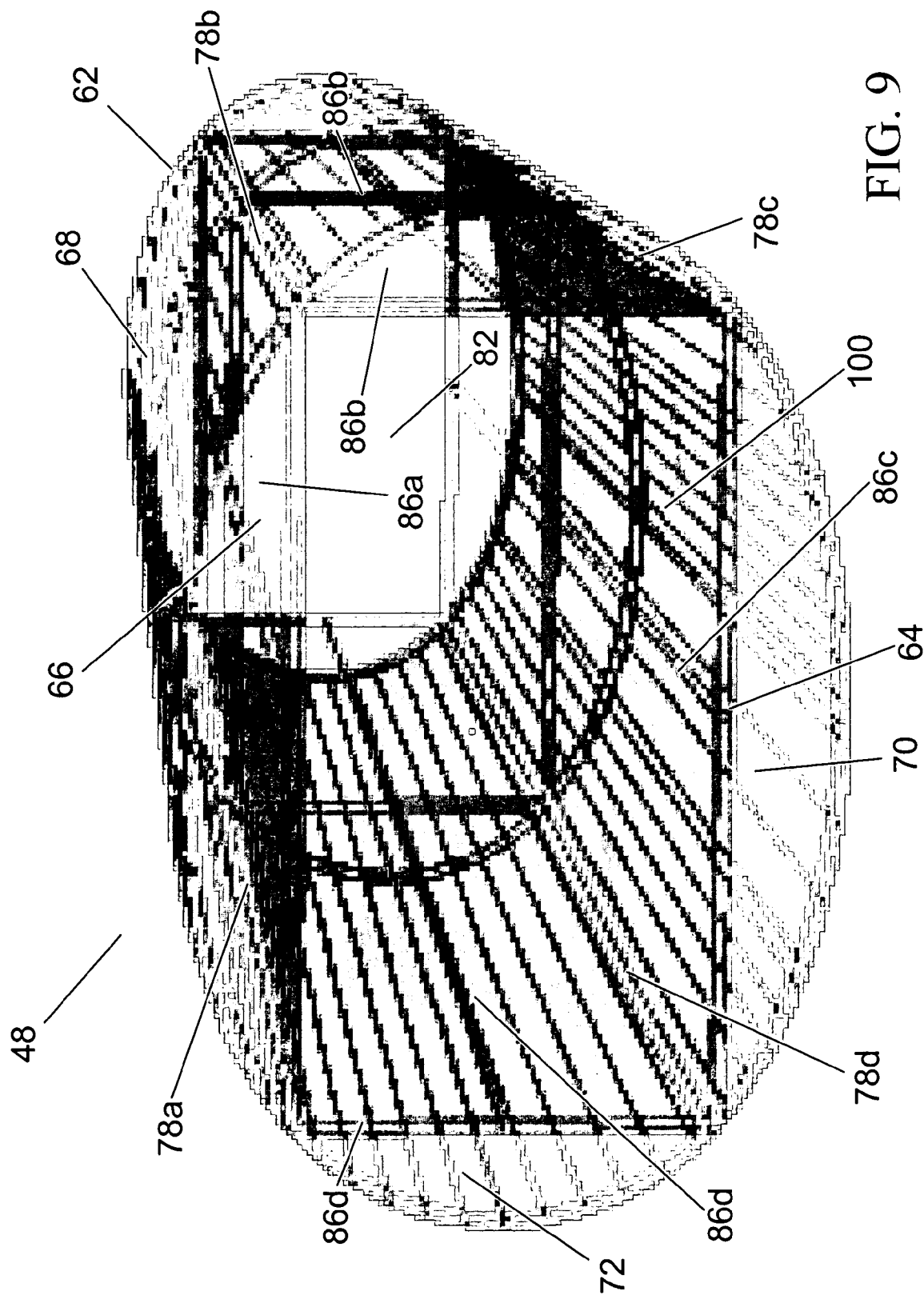
FIG. 9 is a computer-generated perspective view of the fuselage of the inventive UAV shown in FIG. 1, particularly illustrating how the fuselage includes, as an integral unit, (i) a cylindrical shell (the main exterior component of the fuselage) and (ii) a box-shaped container (the main interior component of the fuselage) such as that shown in FIG. 6, wherein the four longitudinal outside edges of the box-shaped container are contiguous with respect to the inside surface of the cylindrical shell.
Figure 13:
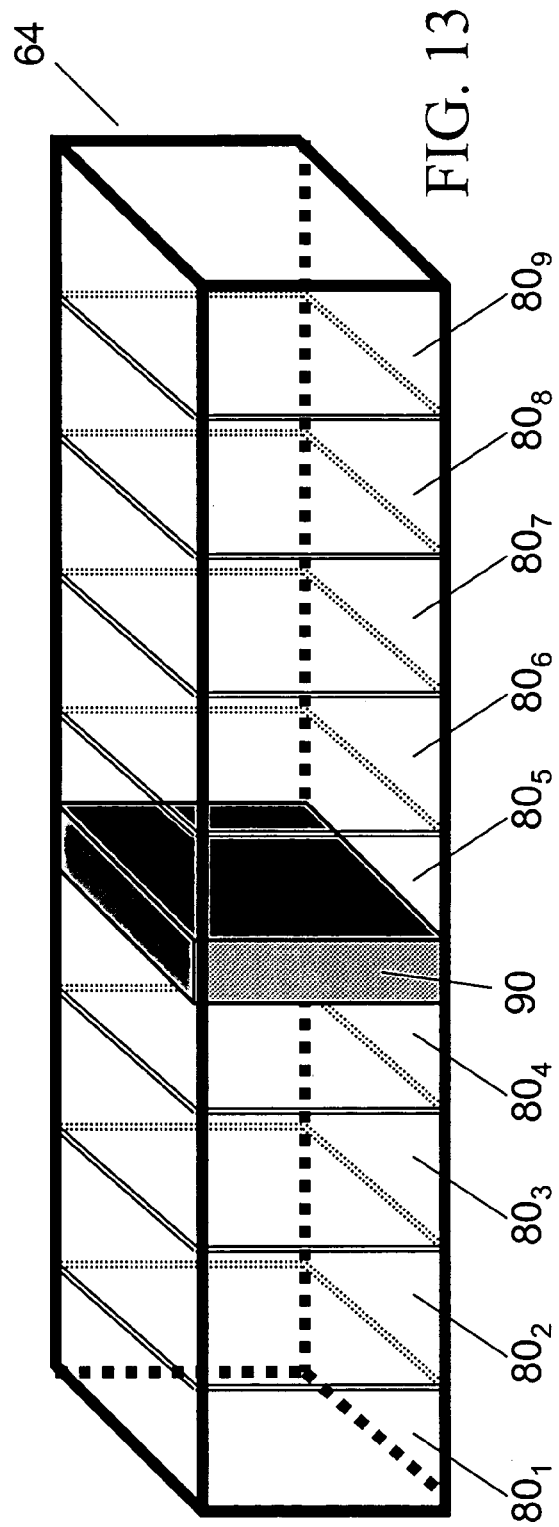
FIG. 13 is a transparent version of the perspective view shown in FIG. 12, particularly illustrating the housing of individual box-shaped compartments inside the box-shaped container.
Figure 14:
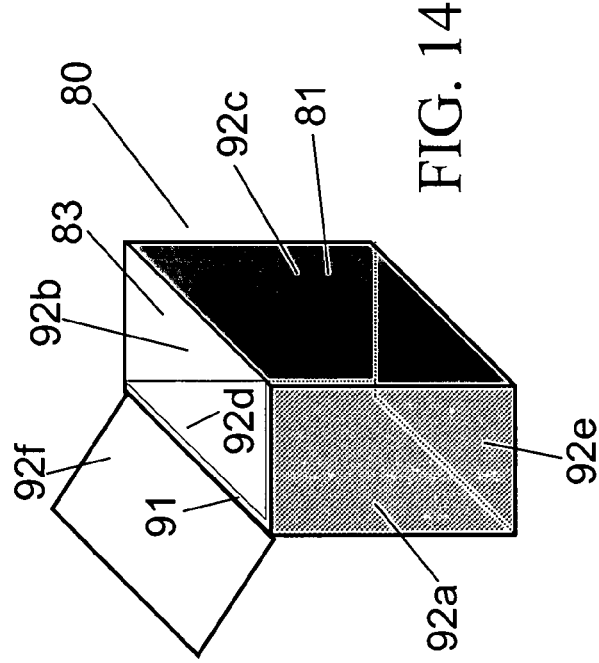
FIG. 14 is a perspective view of a box-shaped compartment such as that shown in FIG. 13.

The modularity of compartments 80 is geometrically illustrated in FIG. 6 through FIG. 8 by the ½-foot-by-½-foot geometric cubical regions that form the storage space 82 of a storage container 64 having the dimensions of length=9 feet, width=2 feet, and height=1 foot. As shown in FIG. 8, and similarly as shown in FIG. 13, container space 82 is occupied by nine compartments 80, longitudinally stacked, each compartment 80 having the dimensions of length=1 foot, width=2 feet, and height=1 foot. However, the dimensions of compartments 80 can be varied and still afford modularity for a given container space 82; for instance, 1 ft×1 ft×1 ft compartments 80, and/or 2 ft×1 ft compartments 80, and/or 1 ft×2 ft×1 ft compartments 80, etc., can be used in various combinations. In the light of the instant disclosure, the diverse geometric strategies for achieving the "modularization" of container 64 and the compartments 80 contained thereby will be readily apparent to the ordinarily skilled artisan.

As shown in FIG. 15, the interior surface 72 of container 64 has a regular trapezoidal prism shape that differs from the rectangular prism shape of the exterior surface 66 of container 64. In FIG. 15, interior space 82 of container 64 has a regular trapezoidal cross-section. In a manner analogous to the opening and closing of a kitchen drawer, compartments 80 can be moved into and out of the fuselage chamber using a railing mechanism 94, which includes skids, rails and/or rollers. A simpler container shape is depicted in FIG. 16, in which the interior surface 100 of container 64 has a rectangular prism shape similar to that of the exterior surface 66 of container 64. As shown in FIG. 16, interior space 82 of container 64 has a rectangular cross-section. The rectangular box-shaped compartments 80 and rectangular box-shaped partitions 90 can be moved into and out of the interior space 82 of container 64, with mechanical assistance, by means of sliding along the flat bottom portion of the interior surface 72 of container 64. As compared with a sliding system such as shown in FIG. 16, a railing system such as shown in FIG. 15 may make for easier loading of compartments 80 inside container 64. An important consideration for inventive practice generally is the size of the interior storage space 82 of container 64. For many inventive applications, it is desirable to maximize or nearly maximize storage space 82 of container 64. A larger storage space 82 will permit situation of larger sized compartments 80 inside storage space 82. Space optimization can be inventively achieved, for example, by providing a container 64 that is relatively thin-walled and yet retains requisite structural integrity.

At least one of the non-fuselage components (i.e., either tail 50 or nose 46) must be separated from fuselage 48 in order to permit the loading and sealing (via installation in container 64 of attachable/detachable container end face 86*f*) of container 64. In other words, it is possible to load and seal container 64 while neither or one, but not both, of tail 50 and nose 46 are attached to fuselage 48. Once the attachable/detachable container end face 86*f* is secured with respect to the rest of container 64, assembly of glider body 42 can be completed.

Tail 50 via casing 96 (at front tail end 106) is attached to fuselage 48 (at back fuselage end 76), thereby forming back junction 196. At junction 106, tail casing 96 and fuselage shell 62 define approximately equal elliptical cross-sectional shapes, as they should establish a flush connection. Nose 46 (at back nose surface 86) is attached to fuselage 48 via cylindrical shell 62 (at front fuselage end 74), thereby forming front junction 194. At junction 104, tail casing 96 and fuselage shell 62 define approximately equal elliptical cross-sectional shapes, as they should establish a flush connection. Typically according to the present invention, the attachments of tail 50 and nose 46 to fuselage 48 will be effected entirely with respect to the cylindrical shell 62 component of fuselage 48; however, some inventive embodiments may prescribe involvement of container 64 in these couplings.

Nose 46 is a solid piece having an essentially flat back surface 86 that, as is shown in FIG. 6 and FIG. 7, abuts the front end face 86*e* of container 64 when nose 46 is attached to fuselage 48. Nose 46 includes a high-density foam core 94 (a solid block of foam) and a composite outer skin (skin overlay) 98 made of a fiber-reinforced plastic (FRP), such as a graphite-epoxy, characterized by multidimensional fibers. Having a construction analogous to that of a pilot flight helmet having one or more crushable, energy-absorbing foam linings, nose 46 is designed to insulate glider 40 and its contents from significant damage by acting as a buffer or shock absorber. In particular, nose 46 is designed to mitigate shock such as might be associated with the landing of glider 40 upon a ground surface. As illustrated in FIG. 10, the nose's outer skin 98, which surrounds the rigid (inflexible) foam core 94, is shaped like a truncated extreme portion of a three-dimensional ellipsoid. The roundedness of nose skin 98 not only contributes to a protective (e.g., impact-resistive) function of nose 46 but also serves to divert airflow around fuselage 48. Some inventive embodiments may provide for a less than completely solid nose 46 having a hollow area inside foam core 94, such as cavity 112 shown in FIG. 7, for holding electronic apparatus such as relating to command and control.

Like fuselage 48 and nose 46, tail 50 is a rigid structure. Tail 50 includes a casing 96, three tail aerodynamic surfaces 52, and an essentially flat walling structure such as bulkhead 102, located at the fore end 106 of tail 50. There are two basic design directions for tail 50, namely, open-back or closed-back. An open-back tail 50 has a tail opening 109 that is bounded by casing 96 and bulkhead 102, located at tail front 106. A closed-back tail 50 has a tail opening 109 that is additionally bounded by an essentially flat walling structure such as panel 114, located at the back end 108 of tail 50. According to typical inventive embodiments providing a closed-back tail 50, tail opening 109 is suitable for holding electronic equipment such as actuators. A tail 50 having a conical casing 96 such as shown in FIG. 4 is intrinsically closed-back, since it tapers to the vertex of the cone. According to typical inventive embodiments providing an open-back tail 50, tail opening 109 is suitable for housing propulsion means such as rocket motor 120 shown in FIG. 24.

Tail 50 shown in FIG. 11 is configured along the lines of a rocket or missile, with a view toward use in rocket launch modes of the inventive ALDS. The symmetry characterizing the casing 96 and the three tail stabilizers 52 (spaced 120° apart) is intended to benefit vertical rocket launch. As illustrated in FIG. 11, tail casing 96 is shaped like a truncated non-extreme portion of a three-dimensional elliptical cone. Contrastingly, tail casing 96 shown in FIG. 4 is shaped like a cone. The diameter of tail casing 96 gradually decreases in the rearward direction; that is, casing 96 is tapered from tail front end 106 to tail back end 108. Tail bulkhead 102, located at tail front 106, abuts the back end face 86*f* of container 64 when tail 50 is attached to fuselage 48. Hence, back nose surface 86 and bulkhead 102 abut the opposite longitudinal end faces 86*e* and 86*f*, respectively, of container 64. In conjunction, nose surface 86 and bulkhead 102 help to hold container 64 and compartments 80 in place in response to anticipated loadings associated with any and all phases of flight of the fully assembled glider 40.

In accordance with the present invention, the two wings 44*p* and 44*s* will typically be extendable, either inflatedly extendable or unfoldingly extendable. Inflatable wings 44 may be more frequently employed in inventive practice than will be foldable fixed extendable wings 44. A foldable fixed extendable wing is advantageous in its capacity to include ailerons or other flaps or control surfaces; hence, as distinguished from inflatable wings, active control of foldable fixed extendable wings (e.g., using ailerons or other flaps or control surfaces) is feasible. Because an inflatable wing will tend to be simpler and less expensive to implement, an inflatable wing may be the preferred mode for many inventive embodiments. A disadvantage of an inflatable wing is that it cannot be provided with any control surfaces (at least, not without great difficulty); hence, control of an inflatable wing will usually be accomplished exclusively by control surfaces (e.g., rudders) in the tail section, since the inflatable wing will have no control surfaces, essentially being a mere lifting device.

Particularly with reference to FIG. 4, aerodynamic surfaces (such as control surfaces, airbrakes, etc.) will normally be necessary in inventive practice in order to control the flight of glider 40 so that it suitably glides toward and lands at the destination. The various aerodynamic surfaces shown in FIG. 4 (and FIG. 7) are shown for illustrative purposes, only, of the various kinds of aerodynamic surfaces that can be used in inventive practice. FIG. 4 herein is not intended to suggest that all of the aerodynamics surfaces are necessarily recommended in inventive practice, or that the present invention is recommended to be practiced with individual surfaces exactly as shown. Of particular note, inflatable wings 44 as inventively practiced will generally not have any aerodynamic surfaces other than the wings themselves; unfoldable wings 44 as inventively practiced may similarly lack such auxiliary surfaces due to expenses or impracticalities of providing same. If wings 44 do include auxiliary aerodynamic surfaces, wings 44 for instance can include one or two pairs of flaps/ailerons 180*p* and 180*s*, and perhaps a pair of spoilers 182*p* and 182*s*; tail 50 can include a pair of elevators 184*p* and 184*s*, and a rudder 186. It may be preferred in inventive practice to provide a single elevator 184 across the port and starboard sides in tail 50. It may also be preferred in inventive practice to provide just outboard ailerons 180*p* and 180*s*, in the absence of inboard flaps 180*p* and 180*s*. Some inventive embodiments may provide a single aileron 180*p* or 180*s*. In the light of the instant disclosure, the ordinarily skilled artisan will be capable, in inventive practice, of effectuating auxiliary aerodynamic surfaces such as flaps/ailerons 180, spoilers 182 and elevators 184 shown in FIG. 4, and/or rudder 186 shown in FIG. 7.

As noted hereinabove, when the present invention is practiced so as to involve inflatable wings 44, there will usually be no auxiliary aerodynamic surfaces associated with inflatable wings 44; such will frequently be the case for unfoldable wings 44, as well. In the many inventive embodiments for which there are no auxiliary surfaces in the wings 44, inventive glider 40 can be flown solely using aerodynamic surfaces in the tail 50. This is comparable to model airplanes that are flown "rudder only," relying on "dihedral" to effect roll control. Even in the absence of auxiliary aerodynamic surfaces in wings 44, the ordinarily skilled artisan who reads the instant disclosure will be capable, in inventive practice, of controlling flight by only using aerodynamic surfaces in tail 50. In this regard, the aforementioned book Fred Thomas, *Fundamentals of Sailplane Design*, will be instructive, especially its section entitled "Empennage and Controls." Other inventive embodiments may provide for rotatability of wings 44 for contributing toward control of inventive glider 40, albeit such wings 44 would lack auxiliary aerodynamic surfaces.

Haggard U.S. Pat. No. 6, 082, 667 issued Jul. 4, 2000, incorporated herein by reference, and Brown et al. U.S. Pat. No. 5, 244, 169 issued Sep. 14, 1993, incorporated herein by reference, are informative regarding inflatable wings; see also the aforementioned Palmer U.S. Pat. No. 6,260,797 B1 issued Jul. 17, 2001. Paez U.S. Pat. No. 5,372,336 issued Dec. 13, 1994, incorporated by reference, and Rosenberger et al. U.S. Pat. No. 4,717,093 issued Jan. 5, 1988, incorporated herein by reference, are informative regarding rigid wings that are foldable and extendable; see also the aforementioned Yifrach U.S. patent application Publication 2003/0001045 A1 published Jan. 2, 2003.

Figure 17:
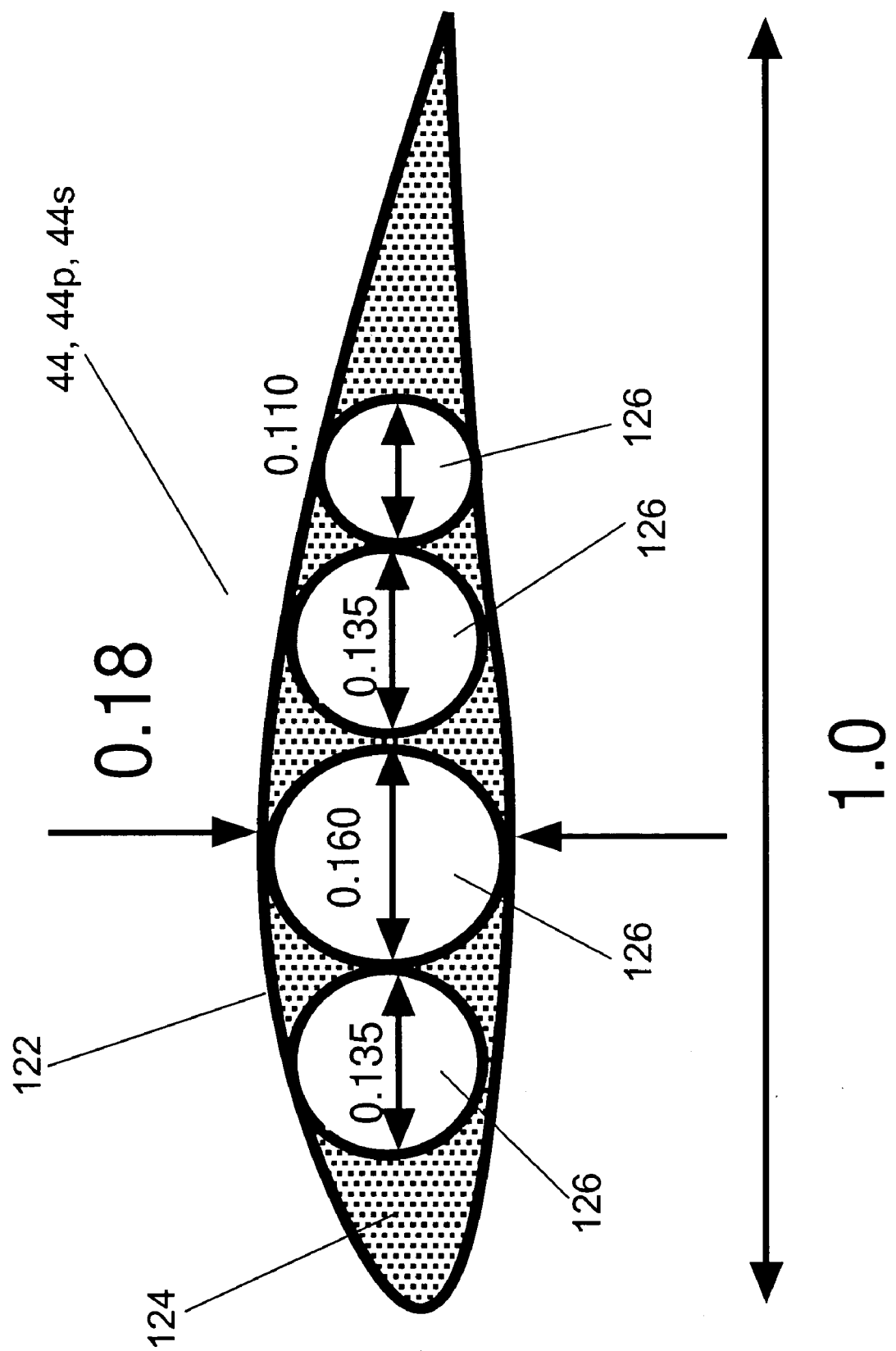
FIG. 17 is a chord-wise cross-sectional view of a typical wing according to inventive embodiments in which the two wings are inflatable, particularly illustrating the arrangement of four span-wise, inflatable, tubular spars through each wing.
Figure 18:
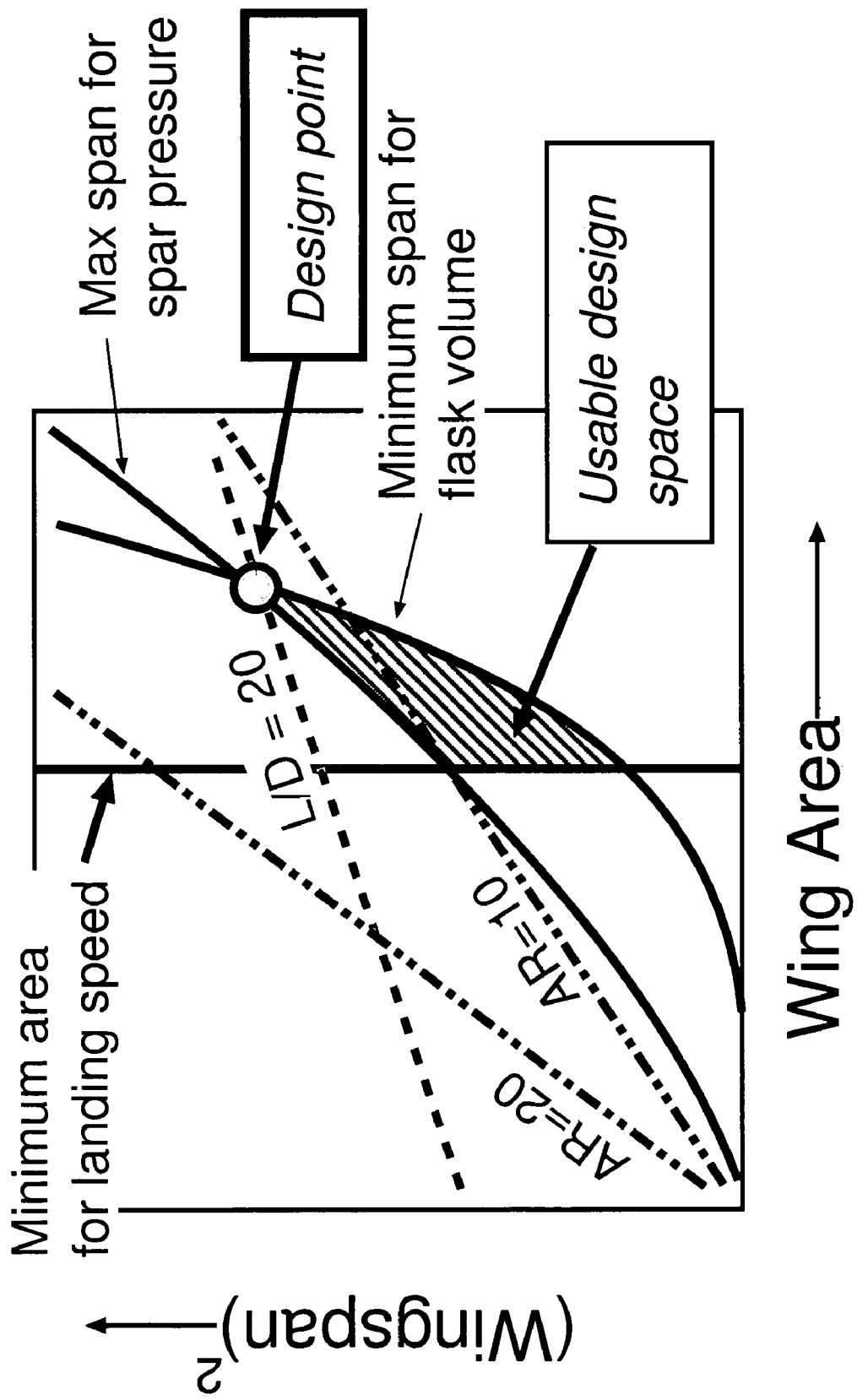
FIG. 18 is a graph illustrating sizing considerations of inflatable wings according to inventive practice.

Reference now being made to FIG. 17 and FIG. 18, an inflatable aerodynamic surface (such as an inflatable wing) is an inflatable structure that is rigid when maximally inflated. As illustrated in FIG. 17, the port and starboard inflatable wings 44*p* and 44*s* each include a cloth outer covering 122 (including fabric mesh outer skin and a rubber, e.g., neoprene, inner lining), non-rigid (flexible) foam 124, and plural inflatable tubular spars 126 surrounded by the foam 124 and running span-wise through the wing 44. The inflatable spars 126 are made of a similar type of cloth material including fabric mesh outside and rubber (e.g., neoprene) inside. The inflatable wing 44 is configured toward inflatability to a pre-designed shape. Each inflatable wing 44 inflates by means of inflation of the spars. That is, the wing does not inflate in its entirety; rather, only the spars 126 inflate. When in a deflated condition, the two wings 44*p* and 44*s* are "packed" (e.g., fan-folded or accordion-folded) against their respective sides of the fuselage 48; alternatively, the two wings 44*p* and 44*s* can be temporarily confined to enclosing (e.g., shell-like) structures on the sides of fuselage 48. When the spars are pressurized (e.g., maximally inflated), this results in a high bending modulus (high resistance to bending) of the wing, thereby contributing to the imposition of a desired shape of the fully and rigidly deployed wing.

Among the manufacturers of inflatable wings is Vertigo Inc. (mailing address P.O. Box 117, Lake Elsinore, Calif. 92531-0117; shipping address 29885 2nd Street, Suite N, Lake Elsinore, Calif. 92532; phone 909-674-0604; fax 909-674-5461; website http://www.vertigo-inc.com/home.html). The Vertigo Inc. web page on inflatable wings, http://www.vertigo-inc.com/Aeronautical_Systems/GLOV/GLOV.html, includes a series of photographs illustrating the wing deployment sequence. It is stated therein that the Vertigo Inc.'s inflatable "wing consists of foam wrapped over inflatable spars and covered with cloth. The spars are inflated through a common manifold. The structural integrity of the wing comes from the series of inflatable spars in the wing. These spars are made of a flexible composite. The composite consists of a urethane gas barrier wrapped with a high strength fiber braid in a thermoplastic adhesive matrix. The wing spars are made in several different diameters (the largest being around ¾") to give the airfoil shape to the wing. The wing spars are covered with open cell foam and a nylon fabric shell to form the smooth wing surfaces. The working pressure of the wing spars is 300 psi, which makes them very rigid. There are spar caps on the top and the bottom of the wing spars which give even more g-loading capability."

Frequent inventive practice will provide for gaseous inflatability of the wing spars. Nevertheless, it may be advantageous to use a liquid rather than a gas to inflate an inflatable wing spar (e.g., a spar 126 shown in FIG. 17). Using liquid instead of gas may prove especially effective in inventive embodiments in which a particular liquid (e.g., potable water, orange juice, cleaner, fuel, etc.) needs to be carried onboard anyway, and hence can be at least partially contained as the inflating fluid. Use of liquid instead of gas may afford benefits aside from considerations of cargo-carrying efficiency. Firstly, distributing the mass of a liquid along the wingspan may be structurally favorable, as compared with gas, because the liquid reduces wing bending moments (i.e., reduces concentrated loads). Furthermore, use of liquid (instead of gas) may reduce energy requirements to inflate the spar. Once the spar is fully inflated to zero gauge pressure, it will take much less work to pump it up to full structural pressure if the fluid is incompressible (or nearly so). To illustrate this point with a limiting case, for an ideally incompressible fluid in an infinitely stiff spar, the work required would be zero, while the work required to bring a gas-filled spar up to pressure would still be finite. Moreover, use of liquid (instead of gas) may simplify the problem of maintaining pressure in the spar following inflation.

Reference is now made to FIG. 19 through FIG. 22, which give examples of the kinds and configurations of composite materials that can be used for making an inventive glider 40. The material compositions set forth in FIG. 21 pertain to: the outer skin 98 of nose 46; the extreme ("sandwiching") layers 126*a* and 126*b* of the sandwich composite shell 62 of fuselage 48; and, the extreme ("sandwiching") layers 126*a* and 126*b* of the sandwich composite casing 96 of tail 50. The material compositions set forth in FIG. 22 pertain to: the foam core 94 of nose 46; the intermediate ("sandwiched") foam layer 128 of the sandwich composite shell 62 of fuselage 48; and, the intermediate ("sandwiched") foam layer 128 of the sandwich composite casing 96 of tail 50. With a view toward manufacture of a prototypical inventive glider 40, the inventors tentatively prefer the material compositions set forth in the rightmost column of FIG. 21 (i.e., the graphite fiber reinforced epoxy resin matrix material, which has a density of 0.057) and the leftmost column of FIG. 22 (i.e., the foam that has a density of 3 pounds per cubic foot). Many kinds and combinations of composite materials other than those set forth in FIG. 21 and FIG. 22 can be used in inventive practice for various parts of glider 40. For instance, useful for imparting robustness to a composite that includes fiber-reinforced matrix material are commercially available fibers characterized by a high degree of tensile strength, modulus, toughness, dimensional stability and cut resistance, such as Spectra® (a polyethylene fiber manufactured by Allied Signal) and Kevlar® (an aramid fiber manufactured by Dupont).

Figure 23:
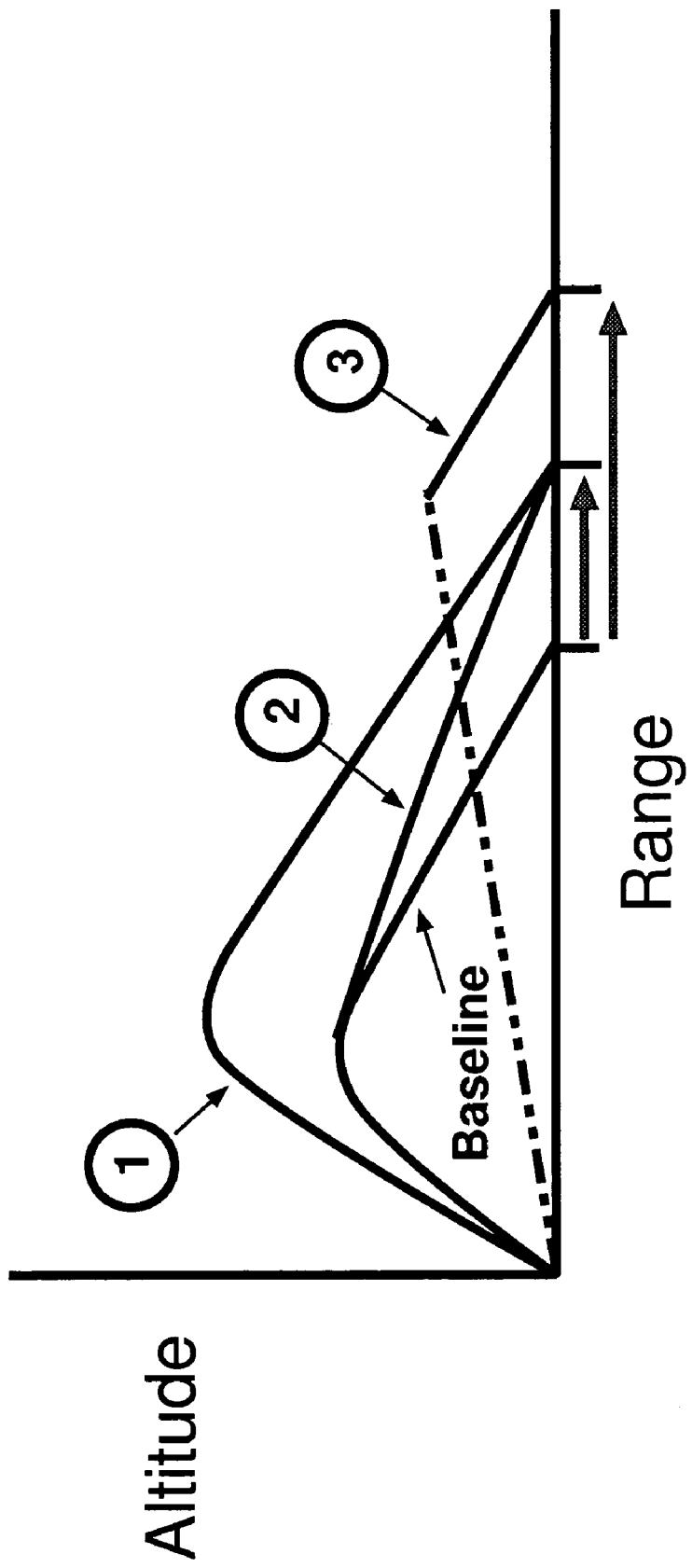
FIG. 23 is a graph illustrating typical relationships, according to inventive practice, among: the distance traveled from the original location to the destination; the distance traveled from the original location to the point of the launching vehicle's release of the inventive UAV; the distance traveled from the point of the launching vehicle's release of the inventive UAV to the destination; and, the altitude achieved by the inventive UAV at the point of the launching vehicle's release of the inventive UAV.
Figure 24:
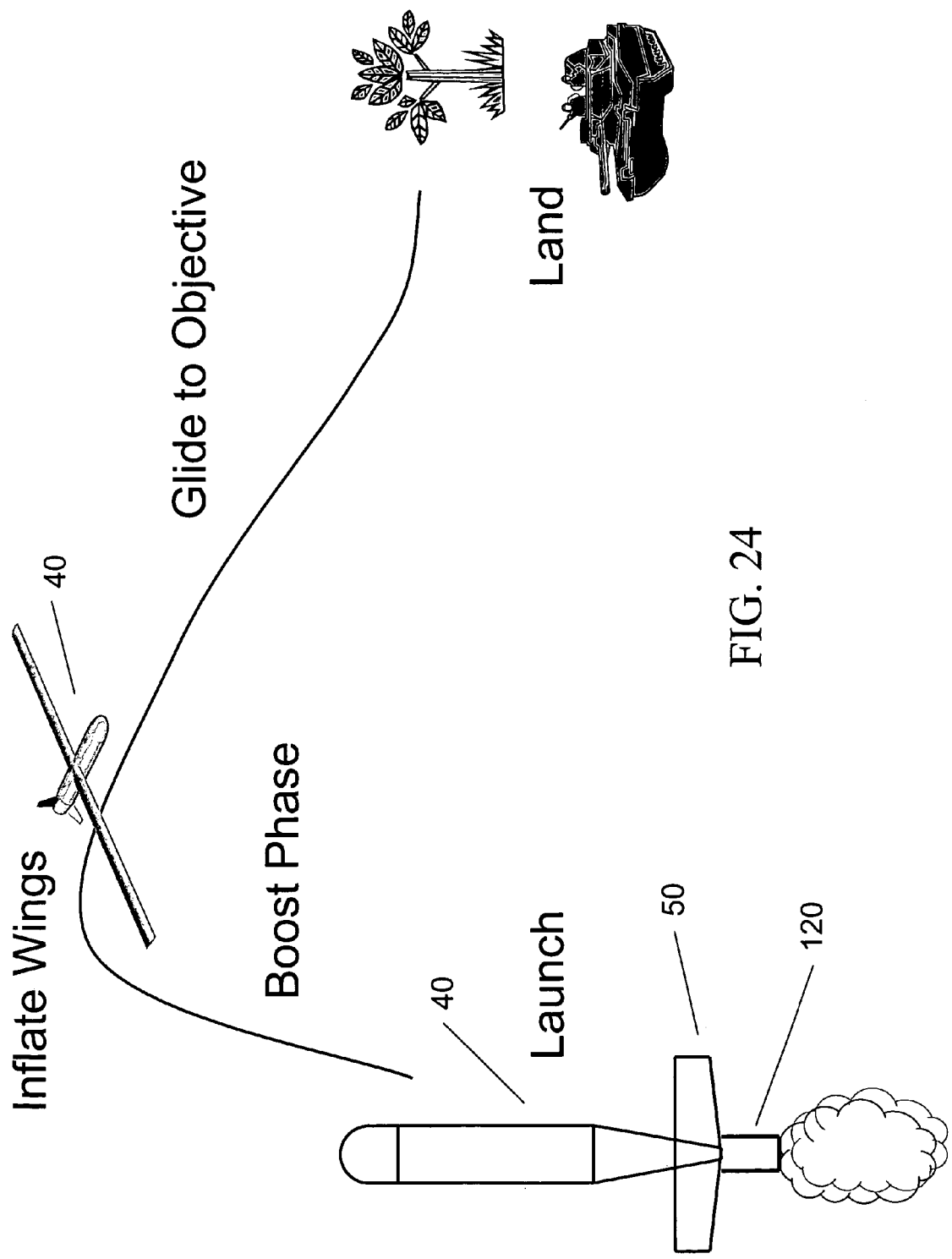
FIG. 24 is a schematic of a typical inventive embodiment involving rocket launch, particularly illustrating the following sequence of events: the launch of the inventive UAV via rocket booster; the generally upward boosting of the inventive UAV until reaching apogee; the release at apogee of the inventive UAV closely followed by wing deployment of the inventive UAV; the gliding of the inventive UAV as it gradually descends toward the destination; and, the landing of the inventive UAV at the destination.
Figure 25:
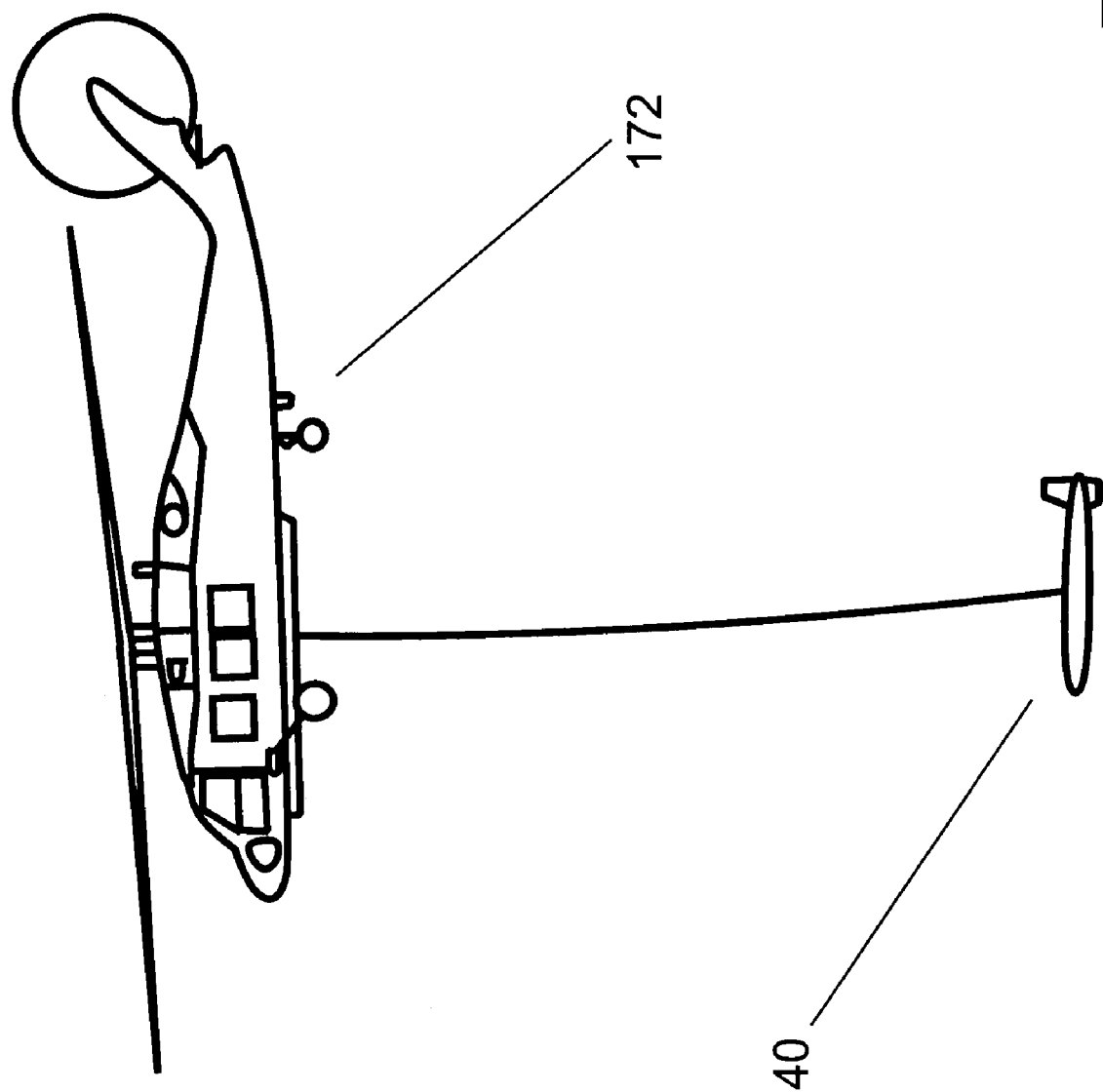
FIG. 25 is a perspective (nearly elevation) view of a typical inventive ALDS embodiment involving helicopter launch.
Figure 26:
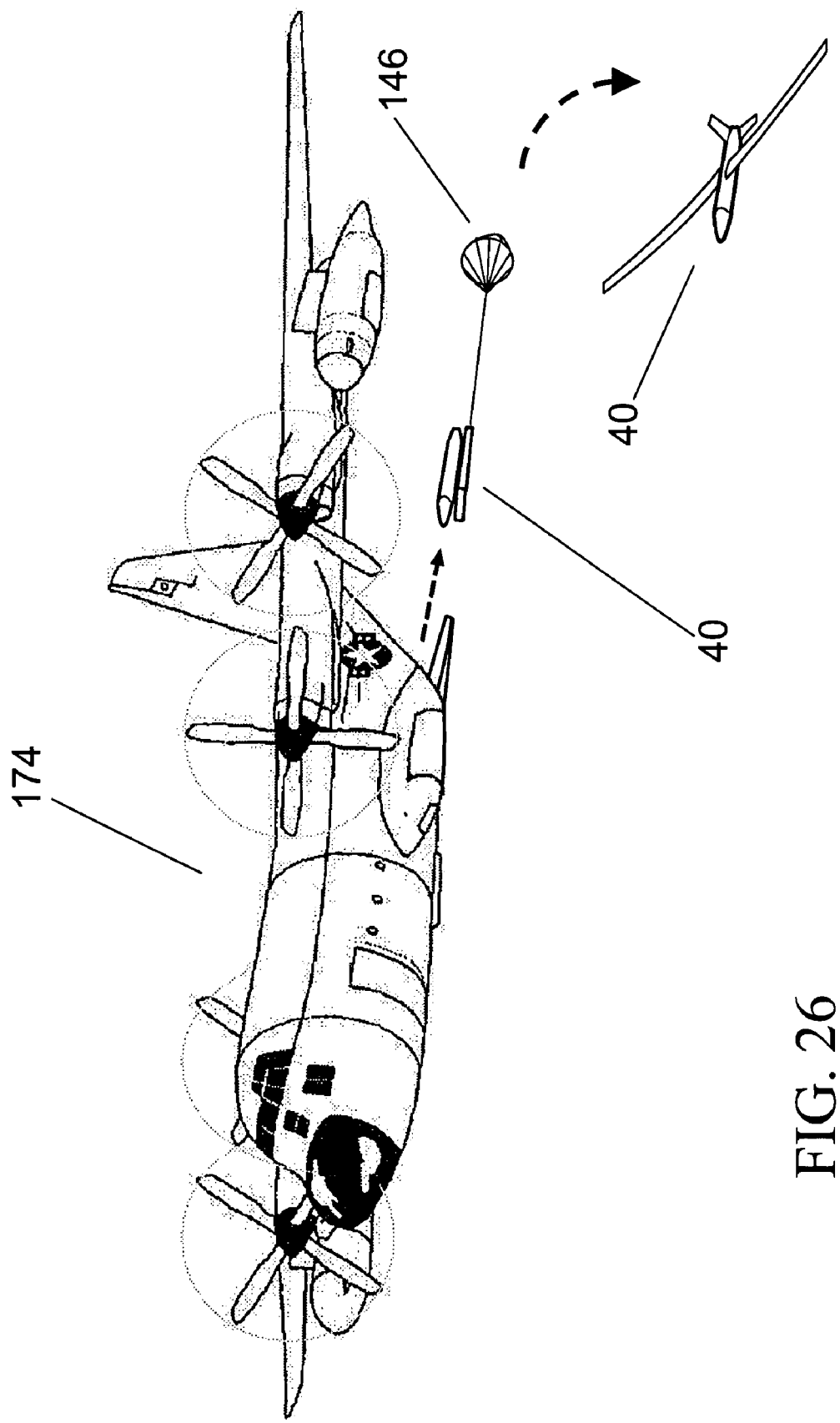
FIG. 26 is a perspective view of a typical inventive ALDS embodiment involving airplane launch, particularly illustrating parachute extraction and airdrop of the inventive UAV from the airplane.
Figure 27:
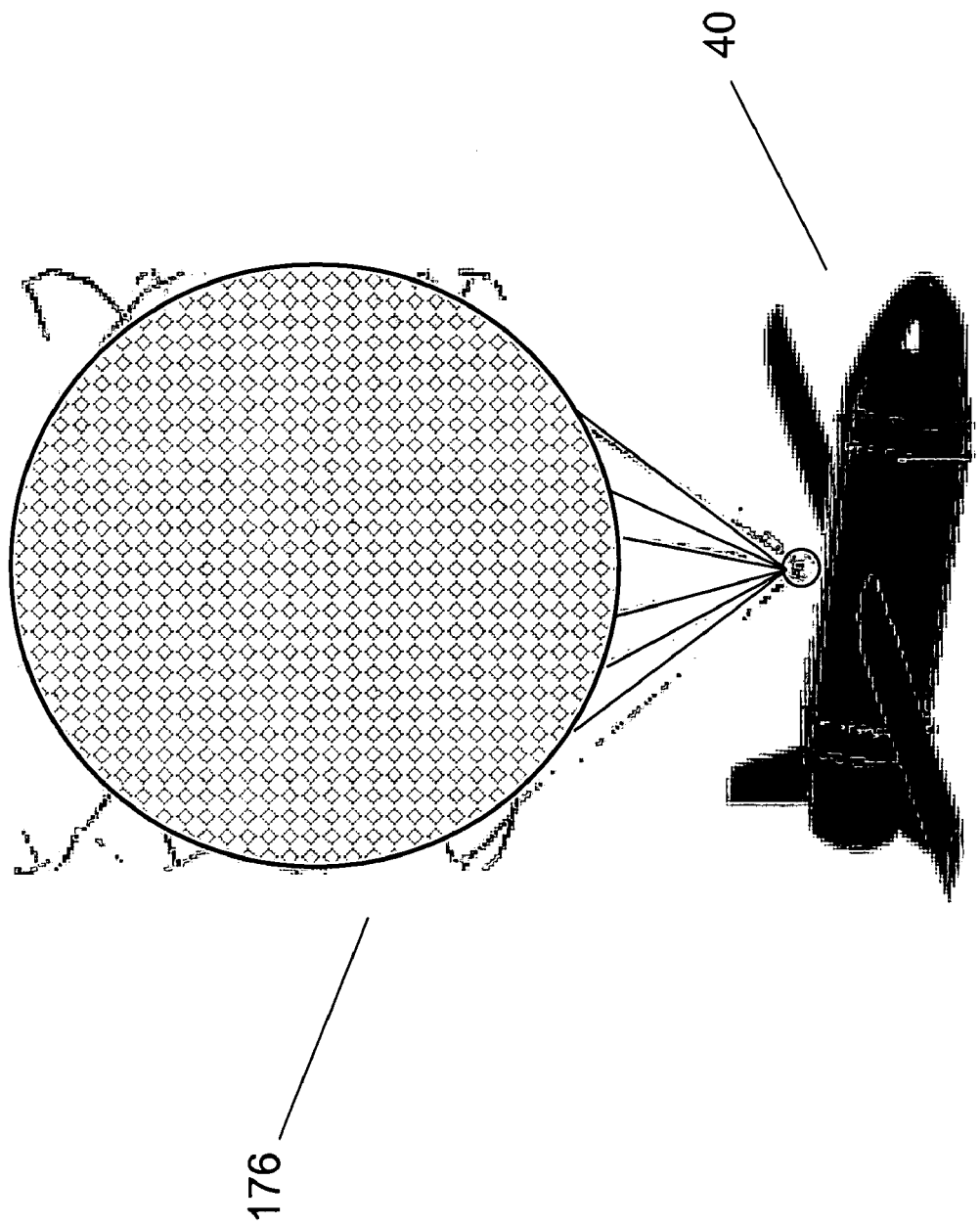
FIG. 27 is a perspective view of a typical inventive ALDS embodiment involving balloon launch.

Now referring to FIG. 23 through FIG. 30, many embodiments of the present invention's ALDS use a non-powered aircraft such as glider 40, thus relying on the aircraft's glide path to reach the destination target. Illustrated in FIG. 23 are four start-to-finish flight paths, viz., the "baseline" and three variations thereof (numbered "1," "2" and "3"). FIG. 23 demonstrates the versatility of inventive practice in terms of various parameters (including launch distances, launch altitudes and gliding distances) in the context of the entire logistical delivery process from start to finish. The variability of such parameters will to some extent depend upon which mode of launch (e.g., boost, lift, etc.) is employed, for instance, via rocket 170 (such as shown in FIG. 24), helicopter 172 (such as shown in FIG. 25), airplane 174 (such as shown in FIG. 26), or balloon 176 (such as shown in FIG. 27).

Each launch mode has its advantages and disadvantages. For instance, as distinguished from helicopter launch and airplane launch, rocket launch and balloon launch not put aircrew at risk. A rocket is potentially hazardous to ground personnel. An airplane may be capable of achieving greater geographical distances than can a helicopter. With people present in a launch vehicle (e.g., a helicopter or airplane), the greater element of human control may be beneficial. A rocket may be capable of achieving higher altitudes, as compared with other launching modes, for releasing the inventive glider 40. Other considerations pertinent to selection and design of the launch mode include the expense involved, the signature (e.g., acoustic, radar, etc.) of the launching vehicle, and the signature (e.g., acoustic, radar, etc.) of the inventive glider 40.

FIG. 24 is a start-to-finish schematic drawing representative of the rocket-launch mode of inventive practice. Inventive glider 40 having open-back tail 50 is launched via rocket motor 120 with which open-back tail 50 is fitted, inside opening 109 of tail 50. The combination of the glider 40 and the rocket motor 120 proceeds in a generally upward (shown in FIG. 24 to be non-vertical) flight trajectory. Deployment of inflatable wings 44p and 44s takes place at apogee. Finally, glider 40 lands precisely on target. FIG. 26 illustrates the deployment of an inventive glider 40, using a parachute 146, from the aft end of a military air transport (for instance, a U.S. military C-130 aircraft). Subsequently, parachute 146 is shed and inventive glider 40 deploys its wings 44, eventually reaching the destination target. FIG. 26 further illustrates how the present invention can be practiced whereby plural inventive gliders 40 are sequentially deployed from the aft end of a military air transport vehicle.

Figure 28:
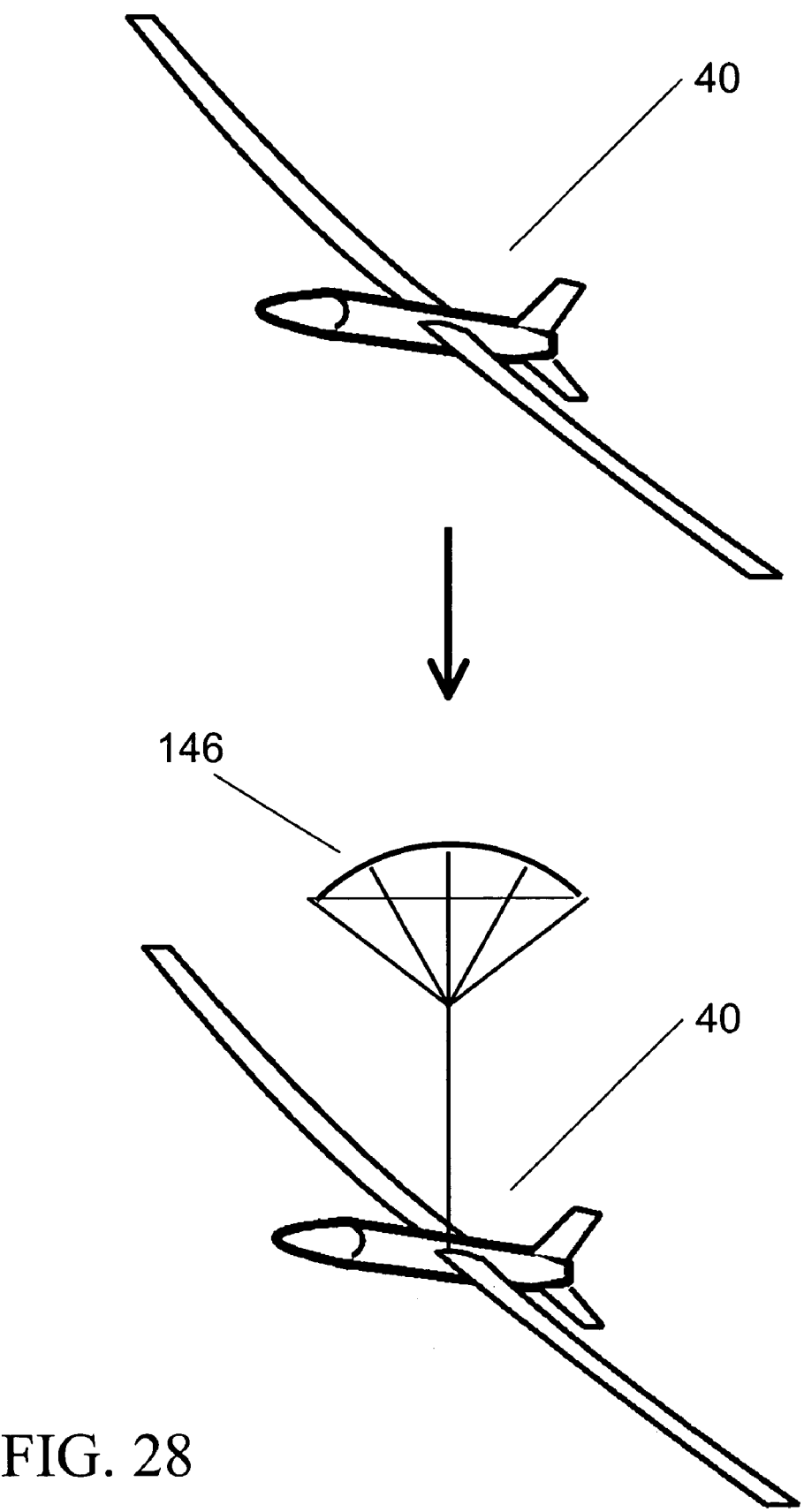
FIG. 28 is a perspective view diagram of a typical inventive ALDS embodiment in which the inventive UAV is parachuted down, the inventive UAV being situated vertically above the target location at an altitude suitable for parachute deployment by the inventive UAV.
Figure 29:
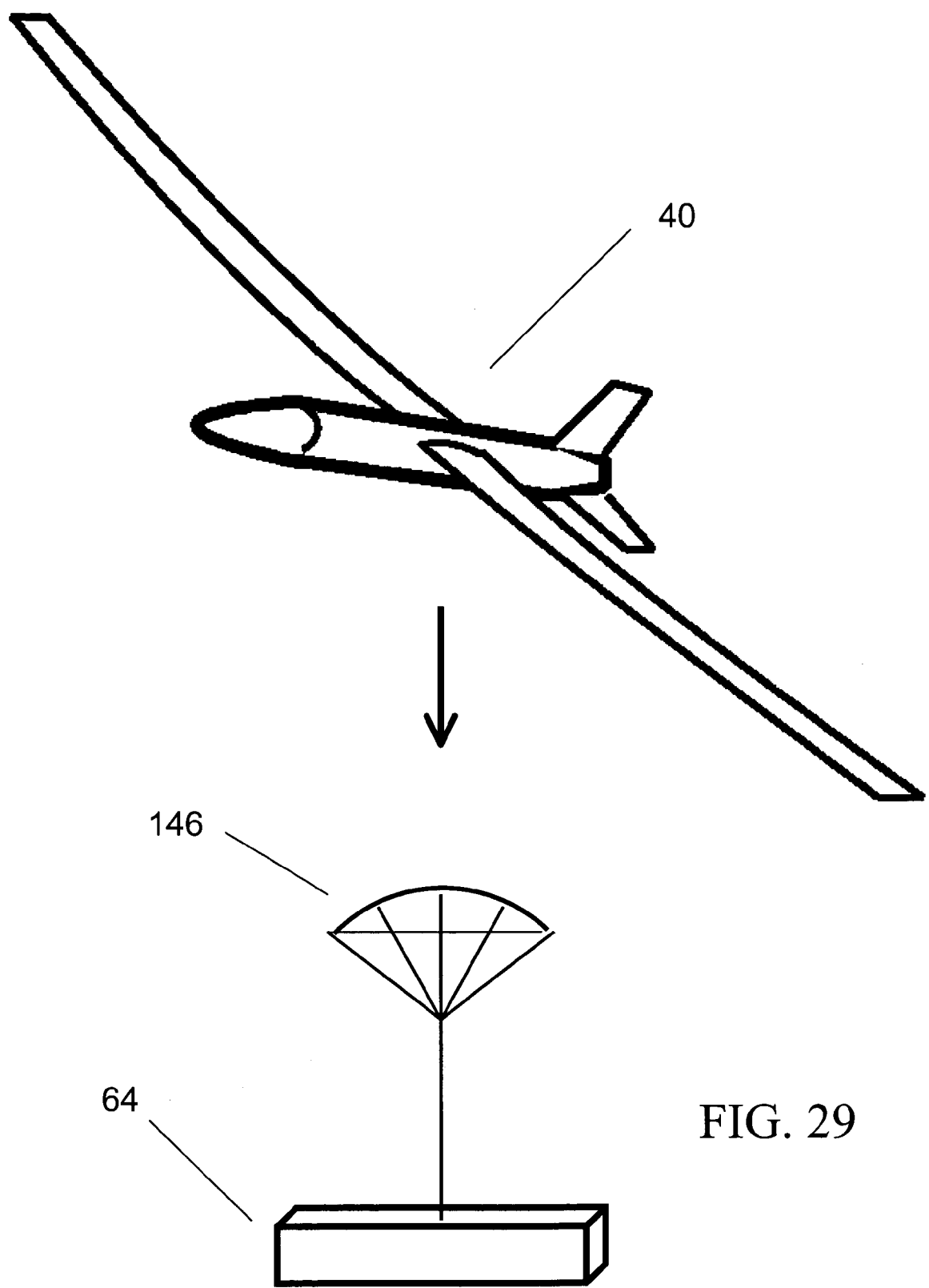
FIG. 29 is a perspective view diagram of a typical inventive ALDS embodiment in which the inventive UAV's box, shaped container is airdropped from the rest of the inventive UAV, the inventive UAV being situated vertically above the target location at an altitude suitable for parachute airdrop of the box-shaped container by the inventive UAV.
Figure 30:
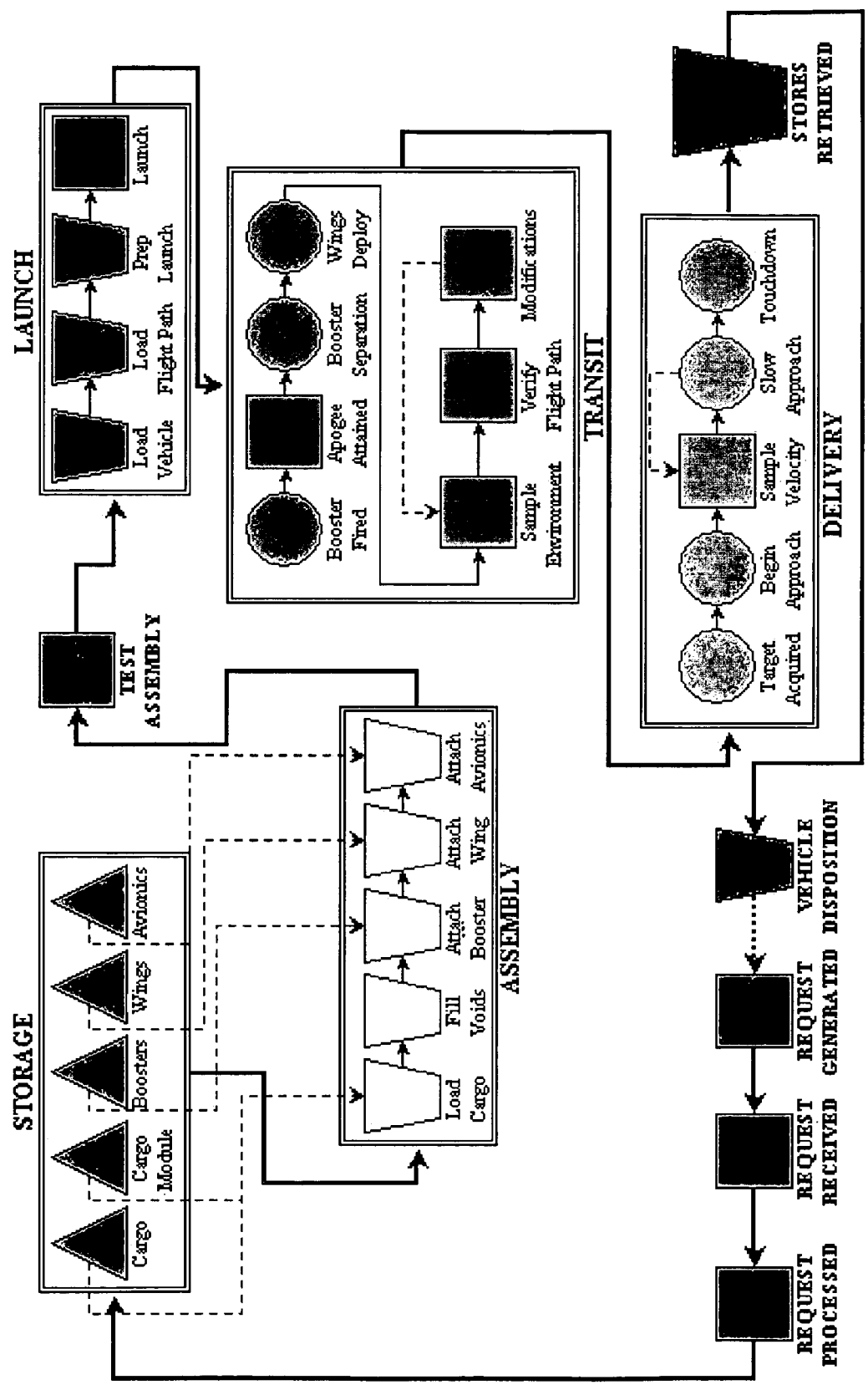
FIG. 30 is a flow diagram of various stages and procedures according to a typical inventive ALDS embodiment.

The more usual inventive embodiments, as emphasized herein, will involve the landing of inventive glider 40 at the target location. Other inventive embodiments, such as depicted in FIG. 28 and FIG. 29, will involve some kind of parachuting during the flight of glider 40 at a point that glider 40 is at an appropriate parachute-deployment height and has reached its destination. As to whether glider landing or parachute landing is preferable, the effects (either upon glider 40 or container 64) of topography and existing obstacles on landing are among the factors to be considered. In any event, inventive practice will generally provide for the necessary survivability of the payload, albeit typical embodiments will call for the expendability of inventive glider 40.

Shown in FIG. 28 and FIG. 29 are two inventive embodiments implementing parachute ejection mechanism, wherein parachute 126 is deployed while inventive glider 40 is approximately directly over the target location but still at an appreciable parachute-capable altitude. FIG. 28 illustrates an inventive embodiment involving parachute drop of inventive glider 40. FIG. 29 illustrates an inventive embodiment involving parachute drop of the payload container 64 from inventive glider 40. With regard to inventive embodiments such as shown in FIG. 29, inventive glider 40 can be designed, for example, so that fuselage 48 can be controllably disintegrated in such a way as to discharge container 64 intact.

For many military applications, the present invention's Advanced Logistics Delivery System (ALDS) represents a simple, effective and affordable system of delivering moderate payloads (e.g., around 1,000 pounds) to troops operating far inland by means of autonomous, unmanned, quiet, un-powered vehicles (such as glider 40) launched from existing platforms (especially, air-based or sea-based platforms). The inventive ALDS affords unmanned, long distance logistics support at low cost. The present invention's ALDS unites at least three main elements. The most significant element of the inventive ALDS is the inventive UAV, an unmanned and un-powered payload vehicle (such as glider 40) that is inexpensive to fabricate and is thus disposable on landing. Other elements of the inventive ALDS are a preprogrammed autonomous flight avionics suite and a multi-variant launch platform.

The present invention's avionics suite will typically include an integrated GPS-based preprogrammed guidance, navigation and control system software that will allow the inventive UAV to be autonomous in flight while being capable of precise landing on target. Preferably, all of these guidance components will be off-the-shelf, low-cost items. The inventive system's multi-variant launch capability will inure from the inventive UAV's admissibility of being launched from a variety of non-dedicated air-based (helicopter, fixed wing transport, etc.), land-based (rocket boost, etc.) or ship-based (rocket boost, helicopter, etc.) platforms. Thus, the inventive ALDS will be able to take advantage of whatever launch facility is available (e.g., in time of need). This launch flexibility characterizing the inventive ALDS is expected to satisfy the logistic demands of delivering Spec Ops payloads under many different launch scenarios.

Other embodiments of the present invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. An aircraft comprising a fuselage, said fuselage including a shell and a container, said shell approximately describing a cylindrical shape, said container approximately describing a box shape, said fuselage being characterized by a fuselage length and a fuselage geometric axis, said shell and said container each being symmetrical with respect to said fuselage geometric axis, said shell defining an outside shell surface and an inside shell surface, said inside shell surface delimiting an interior shell void, said container including four longitudinal container faces and two end container faces, said four longitudinal container faces and said two end container faces defining an exterior container surface and an interior container surface, said interior container surface delimiting an interior container space, said four longitudinal container faces forming four longitudinal container edges in said exterior container surface, each said longitudinal container edge being formed by two adjoining said longitudinal container faces, said container being situated in said interior shell void so that said four longitudinal container edges contact said interior shell surface, said aircraft further comprising plural compartments, each said compartment approximately describing a box shape, each said compartment including four longitudinal compartment faces and two end compartment faces, said four longitudinal compartment faces and two end compartment faces defining an exterior compartment surface and an interior compartment surface, said exterior compartment surface being conformal with respect to said interior container surface, said compartments being capable of situation in said interior container space so that said compartments are arranged sequentially and so that the combination including said shell, said container and said compartments has an integral structure characteristic, said aircraft further comprising a nose, a tail and a pair of wings, said fuselage having a front fuselage end and a back fuselage end, said aircraft nose being connectable to said fuselage at said front fuselage end, said aircraft tail being connectable to said fuselage at said back fuselage end, said wings being connectable to said fuselage at opposite locations alone a portion of said fuselage length, said tail including a tail casing and three tail stabilizers, said wings being extendable from said fuselage, said wings including plural inflatable spars, each said wing including at least one said inflatable spar.

2. The aircraft according to claim 1, the combination including said shell and said container having an integral structure characteristic.

3. The aircraft according to claim 1, said shell approximately describing an elliptical cylindrical shape.

4. The aircraft according to claim 1, said compartments being capable of situation in said interior container space so that said compartments are arranged adjacently so as to at least substantially occupy said interior container space.

5. The aircraft according to claim 1, said aircraft further comprising at least one compartment analogue member, each said compartment analogue member being capable of situation in said interior container space so that said compartments and said at least one compartment analogue member together are arranged sequentially and so that the combination including said shell, said container, said compartments and said at least one compartment analogue member has an integral structure characteristic.

6. The aircraft according to claim 5, said compartments and said compartment analogue members being capable of situation in said interior container space so that said compartments and said compartment analogue members are arranged adjacently so as to at least substantially occupy said interior container space.

7. The aircraft according to claim 1, one said end container face being attachable and detachable for facilitating ingress and egress of said compartments with respect to said interior container space, said interior compartment surface of each said compartment delimiting an interior compartment space, each said compartment including a said longitudinal compartment face that is attachable and detachable for facilitating ingress and egress of cargo with respect to said interior compartment space.

8. The aircraft according to claim 7, said compartments being capable of situation in said interior container space so that the combination including said shell, said container, said compartments and said cargo has an integral structure characteristic.

9. The aircraft according to claim 1, said inflatable spars being inflatable by gas.

10. The aircraft according to claim 1, said inflatable spars being inflatable by liquid.

11. The aircraft according to claim 10, said liquid being potable liquid.

12. The aircraft according to claim 10, said liquid being carried as a payload.

13. An aircraft comprising a fuselage, said fuselage including a shell and a container, said shell approximately describing a cylindrical shape, said container approximately describing a box shape, said fuselage being characterized by a fuselage length and a fuselage geometric axis, said shell and said container each being symmetrical with respect to said fuselage geometric axis, said shell defining an outside shell surface and an inside shell surface, said inside shell surface delimiting an interior shell void, said container including four longitudinal container faces and two end container faces, said four longitudinal container faces and said two end container faces defining an exterior container surface and an interior container surface, said interior container surface delimiting an interior container space, said four longitudinal container faces forming four longitudinal container edges in said exterior container surface, each said longitudinal container edge being formed by two adjoining said longitudinal container faces, said container being situated in said interior shell void so that said four longitudinal container edges contact said interior shell surface, said aircraft further comprising plural compartments, each said compartment approximately describing a box shape, each said compartment including four longitudinal compartment faces and two end compartment faces, said four longitudinal compartment faces and two end compartment faces defining an exterior compartment surface and an interior compartment surface, said exterior compartment surface being conformal with respect to said interior container surface, said compartments being capable of situation in said interior container space so that said compartments are arranged sequentially and so that the combination including said shell, said container and said compartments has an integral structure characteristic, said aircraft further comprising a nose, a tail and a pair of wings, said fuselage having a front fuselage end and a back fuselage end, said aircraft nose being connectable to said fuselage at said front fuselage end, said aircraft tail being connectable to said fuselage at said back fuselage end, said wings being connectable to said fuselage at opposite locations along a portion of said fuselage length, said tail including a tail casing and three tail stabilizers, said wings being extendable from said fuselage, said wings being inflatedly extendable wings, said nose describing a truncated ellipsoidal shape, said tail casing describing a truncated conical shape, said aircraft being characterized by an aircraft length and an aircraft geometric axis, said fuselage geometric axis and said aircraft geometric axis being coincident, said shell, said container, said nose and said tail casing being symmetrical with respect to said aircraft geometric axis.

14. The aircraft according to claim 13, said aircraft being a glider aircraft suitable for un-powered controlled flight, said glider aircraft being characterized by an aspect ratio in the range between approximately eight and approximately twenty, each said stabilizer including at least one control surface.

15. The aircraft according to claim 14, each said wing including at least one control surface.

16. The aircraft according to claim 13, said cylinder and said tail casing each including a composite laminate, said nose including a composite skin and a foam core, said nose thereby being capable of absorbing some energy so as to mitigate the impact associated with the landing of said glider aircraft.

17. The aircraft according to claim 13, said tail casing having an opening, said tail casing thereby being adaptable to coupling with means for producing thrust.

18. An aircraft comprising a fuselage, said fuselage including a shell and a container, said shell approximately describing a cylindrical shape, said container approximately describing a rectangular prism shape, said fuselage being characterized by a fuselage length and a fuselage geometric axis, said shell and said container each being symmetrical with respect to said fuselage geometric axis, said shell defining an outside shell surface and an inside shell surface, said inside shell surface being characterized by an elliptical cross-section perpendicular to said fuselage geometric axis, said inside shell surface delimiting an interior shell void, said container including four longitudinal container faces and two end container faces, said four longitudinal container faces and said two end container faces defining an exterior container surface and an interior container surface, said exterior container surface being characterized by a rectangular cross-section perpendicular to said fuselage geometric axis, said interior container surface delimiting an interior container space, said four longitudinal container faces forming four longitudinal container edges in said exterior container surface, each said longitudinal container edge being formed by two adjoining said longitudinal container faces, said container being situated in said interior shell void so that said four longitudinal container edges contact said interior shell surface and so that said four longitudinal container faces do not contact said interior shell surface, said aircraft further comprising plural compartments, each said compartment approximately describing a rectangular prism shape, each said compartment including four longitudinal compartment faces and two end compartment faces, said four longitudinal compartment faces and two end compartment faces defining an exterior compartment surface and an interior compartment surface, said exterior compartment surface being conformal with respect to said interior container surface, said compartments being capable of situation in said interior container space so that said compartments are arranged sequentially and so that the combination including said shell, said container and said compartments has an integral structure characteristic, said aircraft further comprising a nose, a tail and a pair of wings, said fuselage having a front fuselage end and a back fuselage end, said aircraft nose being connectable to said fuselage at said front fuselage end, said aircraft tail being connectable to said fuselage at said back fuselage end, said wings being connectable to said fuselage at opposite locations along a portion of said fuselage length, said tail including a tail casing and three tail stabilizers, said wings being extendable from said fuselage, said nose describing a truncated ellipsoidal shape, said tail casing describing a truncated conical shape, said aircraft being characterized by an aircraft length and an aircraft geometric axis, said fuselage geometric axis and said aircraft geometric axis being coincident, said shell, said container, said nose and said tail casing being symmetrical with respect to said aircraft geometric axis.

19. The aircraft according to claim 18, said aircraft being a glider aircraft suitable for un-powered controlled flight, said glider aircraft being characterized by an aspect ratio in the range between approximately eight and approximately twenty, each said stabilizer including at least one control surface.

20. The aircraft according to claim 19, each said wing including at least one control surface.

21. The aircraft according to claim 18, said cylinder and said tail casing each including a composite laminate, said nose including a composite skin and a foam core, said nose thereby being capable of absorbing some energy so as to mitigate the impact associated with the landing of said glider aircraft.

22. The aircraft according to claim 18, said tail casing having an opening, said tail casing thereby being adaptable to coupling with means for producing thrust.

* * * * *